United States Patent
Kang

(10) Patent No.: US 11,301,150 B2
(45) Date of Patent: Apr. 12, 2022

(54) MEMORY CONTROLLER AND METHOD FOR UPDATING ADDRESS MAPPING INFORMATION

(71) Applicant: SK hynix Inc., Gyeonggi-do (KR)

(72) Inventor: Hye Mi Kang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 82 days.

(21) Appl. No.: 16/698,296

(22) Filed: Nov. 27, 2019

(65) Prior Publication Data

US 2021/0026548 A1 Jan. 28, 2021

(30) Foreign Application Priority Data

Jul. 26, 2019 (KR) .................. 10-2019-0091200

(51) Int. Cl.
*G06F 12/10* (2016.01)
*G06F 3/06* (2006.01)
*G06F 12/1009* (2016.01)

(52) U.S. Cl.
CPC .......... *G06F 3/0631* (2013.01); *G06F 3/0604* (2013.01); *G06F 3/0679* (2013.01); *G06F 12/1009* (2013.01)

(58) Field of Classification Search
CPC ............. G06F 12/1009; G06F 12/0875; G06F 2212/608; G06F 2212/657
USPC ......................................................... 711/206
See application file for complete search history.

(56) References Cited

U.S. PATENT DOCUMENTS

| 2016/0070652 | A1* | 3/2016 | Sundararaman | G06F 3/065 |
| | | | | 711/154 |
| 2017/0371548 | A1* | 12/2017 | Um | G06F 12/0246 |
| 2018/0121354 | A1* | 5/2018 | Ishiyama | G06F 12/0246 |
| 2018/0157414 | A1* | 6/2018 | Tanaka | G06F 3/0656 |
| 2019/0266079 | A1* | 8/2019 | R | G06F 3/061 |
| 2020/0004679 | A1* | 1/2020 | Szubbocsev | G06F 12/0246 |

FOREIGN PATENT DOCUMENTS

KR 10-2020-0043676 A 4/2020

\* cited by examiner

*Primary Examiner* — Than Nguyen
(74) *Attorney, Agent, or Firm* — IP & T Group LLP

(57) ABSTRACT

The present technology relates to an electronic device. A memory controller according to the present technology has improved map update performance. The memory controller controls a memory device that stores logical to physical map data indicating a mapping relationship between a logical address and a physical address of data. The memory controller includes a map data storage and a map data manager. The map data storage stores physical to logical (P2L) map data generated based on a logical address corresponding to a request received from a host. The map data manager performs a map update operation for the L2P map data by using some of an entire P2L map data stored in the map data storage, according to an amount of the P2L map data stored in the map data storage.

20 Claims, 19 Drawing Sheets

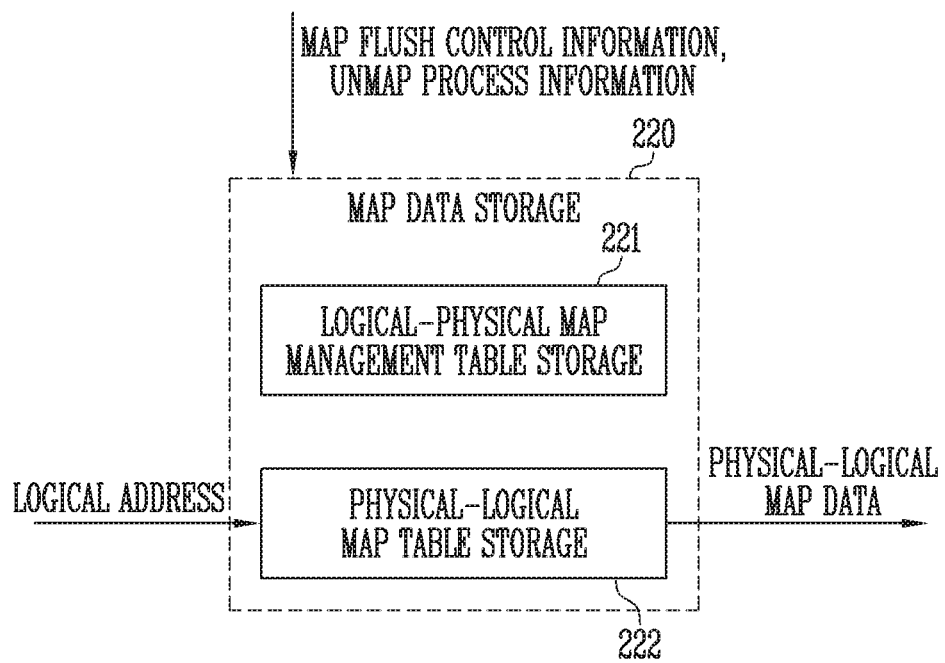

FIG. 7A

| Write Operation | PHYSICAL-LOGICAL MAP TABLE | | | |
|---|---|---|---|---|
| | PHYSICAL ADDRESS(PPN) | | | LOGICAL ADDRESS(LBA) |
| | Index | BLK# | Offset | |

| Write Operation | Index | BLK# | Offset | LOGICAL ADDRESS(LBA) | |
|---|---|---|---|---|---|
| BLK1 PPN1 — LBA1 | PPN1 | 1 | 1 | LBA1 | ⎫ |
| PPN2 — LBA2 | PPN2 | 1 | 2 | LBA2 | ⎬ Map Seg1 |
| PPN3 — LBA3 | PPN3 | 1 | 3 | LBA3 | ⎭ |
| PPN4 — LBA4 | PPN4 | 1 | 4 | LBA4 | ⎫ |
| BLK2 PPN5 — LBA5 | PPN5 | 2 | 1 | LBA5 | ⎬ Map Seg2 |
| PPN6 — LBA6 | PPN6 | 2 | 2 | LBA6 | ⎭ |
| PPN7 — LBA7 | PPN7 | 2 | 3 | LBA7 | ⎫ |
| PPN8 — LBA8 | PPN8 | 2 | 4 | LBA8 | ⎬ Map Seg3 |
| BLK3 PPN9 — LBA9 | PPN9 | 3 | 1 | LBA9 | ⎭ |
| PPN10 — LBA10 | PPN10 | 3 | 2 | LBA10 | ⎫ |
| PPN11 — LBA11 | PPN11 | 3 | 3 | LBA11 | ⎬ Map Seg4 |
| PPN12 — LBA12 | PPN12 | 3 | 4 | LBA12 | ⎭ |

FIG. 7B

Write Operation

BLK1
| PPN1 | LBA1 |
| PPN2 | LBA2 |
| PPN3 | LBA7 |
| PPN4 | LBA8 |

BLK2
| PPN5 | LBA3 |
| PPN6 | LBA4 |
| PPN7 | LBA5 |
| PPN8 | LBA6 |

BLK3
| PPN9 | LBA9 |
| PPN10 | LBA10 |
| PPN11 | LBA11 |
| PPN12 | LBA12 |

PHYSICAL-LOGICAL MAP TABLE

| Index | BLK# | Offset | LOGICAL ADDRESS(LBA) | |
|---|---|---|---|---|
| PPN1 | 1 | 1 | LBA1 | Map Seg1 |
| PPN2 | 1 | 2 | LBA2 | |
| PPN5 | 2 | 1 | LBA3 | |
| PPN6 | 2 | 2 | LBA4 | Map Seg2 |
| PPN7 | 2 | 3 | LBA5 | |
| PPN8 | 2 | 4 | LBA6 | |
| PPN3 | 1 | 3 | LBA7 | Map Seg3 |
| PPN4 | 1 | 4 | LBA8 | |
| PPN9 | 3 | 1 | LBA9 | |
| PPN10 | 3 | 2 | LBA10 | Map Seg4 |
| PPN11 | 3 | 3 | LBA11 | |
| PPN12 | 3 | 4 | LBA12 | |

| PHYSICAL-LOGICAL MAP TABLE ||||||
| PHYSICAL ADDRESS(PPN) |||| LOGICAL ADDRESS(LBA) ||
| Index | BLK# | Offset | Length | | |
| PPN1 | 1 | 1 | 3 | LBA1 | Map Seg1 |
| PPN4 | 1 | 4 | 1 | LBA4 | Map Seg2 |
| PPN5 | 2 | 1 | 2 | LBA5 | |
| PPN7 | 2 | 3 | 2 | LBA7 | Map Seg3 |
| PPN9 | 3 | 1 | 1 | LBA9 | |
| PPN10 | 3 | 2 | 3 | LBA10 | Map Seg4 |

BLK1 { PPN1, PPN4 }
BLK2 { PPN5, PPN7 }
BLK3 { PPN9, PPN10 }

FIG. 8B

| PHYSICAL-LOGICAL MAP TABLE ||||  |
|---|---|---|---|---|
| PHYSICAL ADDRESS(PPN) |||| LOGICAL ADDRESS(LBA) |
| Index | BLK# | Offset | Length | |
| PPN1 | 1 | 1 | 2 | LBA1 |
| PPN5 | 2 | 1 | 1 | LBA3 |
| PPN6 | 2 | 2 | 3 | LBA4 |
| PPN3 | 1 | 3 | 2 | LBA7 |
| PPN9 | 3 | 1 | 1 | LBA9 |
| PPN10 | 3 | 2 | 3 | LBA10 |

BLK1 { PPN1
BLK2 { PPN5, PPN6
BLK1 { PPN3
BLK3 { PPN9, PPN10

Map Seg1: PPN1
Map Seg2: PPN5, PPN6
Map Seg3: PPN3, PPN9
Map Seg4: PPN10

FIG. 8C

| PHYSICAL-LOGICAL MAP TABLE ||||  |
|---|---|---|---|---|
| PHYSICAL ADDRESS(PPN) |||| LOGICAL ADDRESS(LBA) |
| Index | BLK# | Offset | Length | |
| UNMAP ||| 3 | LBA1 |
| UNMAP ||| 1 | LBA4 |
|  |  |  |  |  |
|  |  |  |  |  |
|  |  |  |  |  |

Map Seg1: UNMAP/LBA1
Map Seg2: UNMAP/LBA4

P2L Structure (Linear, SP is fixed)

SP – Start Point
EP – End Point

Index

| SP1-1 | SP2-1 |
|---|---|
| EP1-3 | EP2-2 |

MEMORY CONTROLLER AND METHOD FOR UPDATING ADDRESS MAPPING INFORMATION

CROSS-REFERENCE TO RELATED APPLICATION

The present application claims priority under 35 U.S.C. § 119(a) to Korean patent application number 10-2019-0091200 filed on Jul. 26, 2019, which is incorporated herein by reference in its entirety.

BACKGROUND

1. Field of Invention

The present disclosure relates to an electronic device, and more particularly, to a memory controller and a method of operating the same.

2. Description of Related Art

A storage device is a device that stores data under control of a host device such as a computer or a smartphone. A storage device may include a memory device in which data is stored and a memory controller controlling the memory device. The memory device is divided into a volatile memory device and a non-volatile memory device.

The volatile memory device is a device that stores data only when power is supplied and loses the stored data when the power supply is cut off. The volatile memory device includes a static random access memory (SRAM), a dynamic random access memory (DRAM), and the like.

The non-volatile memory device is a device that does not lose data even when power is cut off. Non-volatile memory devices include a read only memory (ROM), a programmable ROM (PROM), an electrically programmable ROM (EPROM), an electrically erasable and programmable ROM (EEPROM), a flash memory, and the like.

SUMMARY

An embodiment of the present disclosure provides a memory controller having improved map update performance and a method of operating the same.

According to an embodiment of the present disclosure, a memory controller controls a memory device that stores logical to physical map data indicating a mapping relationship between a logical address and a physical address of data. The memory controller includes a map data storage and a map data manager. The map data storage stores physical to logical (P2L) map data generated based on a logical address corresponding to a request received from a host. The map data manager performs a map update operation for the L2P map data by using some of an entire P2L map data stored in the map data storage, according to an amount of the P2L map data stored in the map data storage.

According to an embodiment of the present disclosure, a method of operating a memory controller, which controls a memory device that stores logical to physical map data indicating a mapping relationship between a logical address and a physical address of data, and includes a map data storage, includes storing physical to logical (P2L) map data generated based on a logical address corresponding to a request received from a host in the map data storage; and performing a map update operation for the L2P map data by using some of an entire P2L map data stored in the map data storage, according to an amount of the P2L map data stored in the map data storage.

According to an embodiment of the present disclosure, a memory system comprises a memory device, a map storage circuit and a map data manager. The memory device stores first groups of first-type map data. The map storage circuit generates and temporarily stores second groups of second-type map data according to a circular storage scheme. The map data manager controls the map storage circuit to flush, into the memory device, one or more groups among the second groups and controls the memory device to update the first groups according to the flush of the second groups. wherein the first-type and second-type map data represent different relationships between a physical address of data stored in the memory device and a logical address received from a host.

According to the present technology, a memory controller having improved map update performance and a method of operating the same are provided.

BRIEF DESCRIPTION OF THE DRAWINGS

FIG. 4 is a diagram for describing a map data storage of FIG. 3.

FIG. 5 is a diagram for describing a L2P map management table of FIG. 4.

FIGS. 7A to 7C are diagrams for describing a P2L map table of FIG. 4 according to an embodiment.

FIG. 7A is a diagram for describing a P2L map table at a time when data is sequentially written to an open block.

FIG. 7B is a diagram for describing a P2L map table at a time when data is written to the open block.

FIG. 7C is a diagram for describing a P2L map table during an unmap operation.

FIGS. 8A to 8C are diagrams for describing the P2L map table of FIG. 4, according to another embodiment.

FIG. 8A is a diagram for describing a P2L map table at a time when data is sequentially written to the open block.

FIG. 8B is a diagram for describing a P2L map table at a time when data is written to the open block.

FIG. 8C is a diagram for describing a P2L map table during an erase operation.

DETAILED DESCRIPTION

Hereinafter, an embodiment of the present disclosure will be described in detail with reference to the accompanying drawings.

Figure 1:
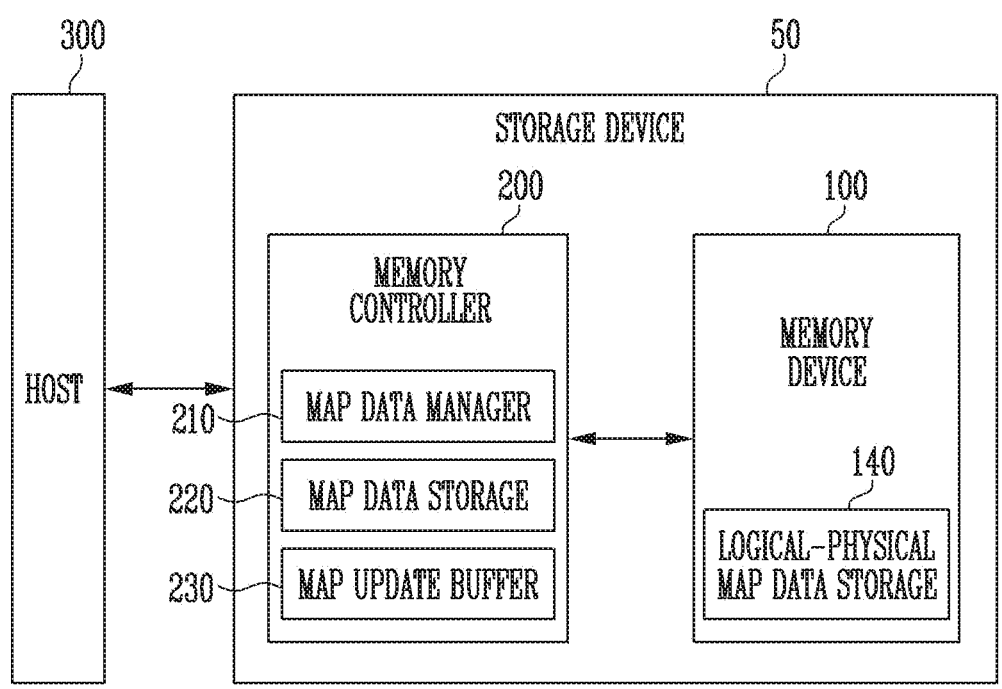
FIG. 1 is a diagram for describing a storage device according to an embodiment of the present disclosure.

FIG. 1 is a diagram for describing a storage device according to an embodiment of the present disclosure.

Referring to FIG. 1, the storage device 50 may include a memory device 100 and a memory controller 200 controlling an operation of the memory device 100. The storage device 50 is a device that stores data under control of a host 300 such as a cellular phone, a smartphone, an MP3 player, a laptop computer, a desktop computer, a game player, a TV, a tablet PC, or an in-vehicle infotainment system.

The storage device 50 may be manufactured as one of various types of storage devices according to a host interface that is a communication method with the host 300. For example, the storage device 50 may be configured as any of various types of storage devices such as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 50 may be manufactured as any of various types of packages. For example, the storage device 50 may be manufactured as any of various types of package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 operates in response to control of the memory controller 200. The memory device 100 may include a memory cell array including a plurality of memory cells storing the data.

Each of the memory cells may be configured as a single level cell (SLC) that stores one data bit, a multi-level cell (MLC) that stores two data bits, a triple level cell (TLC) that stores three data bits, or a quad level cell (QLC) that stores four data bits.

The memory cell array may include a plurality of memory blocks. Each of the memory blocks may include a plurality of memory cells. One memory block may include a plurality of pages. In an embodiment, a page may be a unit for storing data in the memory device 100 or reading data stored in the memory device 100.

The memory block may be a unit for erasing data. In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory device, a resistive random access memory (RRAM), a phase-change memory (PRAM), a magnetoresistive random access memory (MRAM), a ferroelectric random access memory (FRAM), a spin transfer torque random access memory (STT-RAM), or the like. In the present specification, for convenience of description, the memory device 100 is a NAND flash memory.

The memory device 100 is configured to receive a command and an address from the memory controller 200 and access an area selected by the address in the memory cell array. That is, the memory device 100 may perform an operation instructed by the command on the area selected by the address. For example, the memory device 100 may perform a write operation (program operation), a read operation, and an erase operation. During the program operation, the memory device 100 may program data to the area selected by the address. During the read operation, the memory device 100 may read data from the area selected by the address. During the erase operation, the memory device 100 may erase data stored in the area selected by the address.

In an embodiment, the memory device 100 may include a logical to physical (L2P) map data storage 140. The L2P map data storage 140 may store L2P map data indicating a mapping relationship between a logical address of data provided by the host and a physical address of the memory device 100 in which the data is stored.

The L2P map data storage 140 may store a plurality of L2P map segments. Each L2P map segment may have a predetermined size. One L2P map segment may include L2P map data indicating mapping relationships between a plurality of logical addresses and a plurality of physical addresses.

According to a read command provided by the map data manager 210, L2P map data to be updated among the L2P map data stored in the L2P map data storage 140 may be provided to the memory controller 200.

According to a program command provided by the map data manager 210, updated L2P map data stored in a map update buffer 230 may be stored in the L2P map data storage 140.

In an embodiment, the L2P map data storage 140 may correspond to a meta area storing meta data. Each meta area may correspond to one memory cell, a plurality of memory cells, one page, a plurality of pages, one memory block, or a plurality of memory blocks.

The memory controller 200 controls overall operations of the storage device 50.

When power is applied to the storage device 50, the memory controller 200 may execute firmware FW. When the memory device 100 is a flash memory device, the memory controller 200 may operate firmware such as a flash translation layer (FTL) for controlling communication between the host 300 and the memory device 100.

In an embodiment, the memory controller 200 may receive data and a logical block address (LBA) from the host 300 and convert the logical block address (LBA) into a physical block address (PBA) indicating an address of memory cells in which data included in the memory device 100 is to be stored.

The memory controller 200 may control the memory device 100 to perform the program operation, the read operation, or the erase operation in response to a request from the host 300. During the program operation, the memory controller 200 may provide a program command, a physical block address, and data to the memory device 100. During the read operation, the memory controller 200 may provide a read command and the physical block address to the memory device 100. During the erase operation, the memory controller 200 may provide an erase command and the physical block address to the memory device 100.

In an embodiment, the memory controller 200 may generate and transmit the command, the address, and the data to the memory device 100 regardless of the request from the host 300. For example, the memory controller 200 may provide a command, an address, and data to the memory device 100 to perform background operations such as a program operation for wear leveling and a program operation for garbage collection.

In an embodiment, the memory controller 200 may control at least two memory devices 100. In this case, the memory controller 200 may control the memory devices 100 according to an interleaving method to improve operation performance. The interleaving method may be an operation method for overlapping operation periods of at least two memory devices 100.

In an embodiment, the memory controller 200 may include the map data manager 210, a map data storage 220, and the map update buffer 230.

The map data manager 210 may receive a logical address corresponding to the request together with the request from the host 300. The request may be any one of a write request and an unmap request. The map data manager 210 may provide the logical address received from the host 300 to the map data storage 220.

The map data manager 210 may control the map data storage 220 to unmap the L2P map data stored in the map data storage 220.

The map data manager 210 may control the map data storage 220 to flush physical to logical (P2L) map data stored in the map data storage 220.

The map data manager 210 may control the map update buffer 230 and the memory device 100 to update the L2P map data stored in the L2P map data storage 140 based on the P2L map data flushed in the map data storage 220.

The map data storage 220 may store map data addresses indicating locations where the plurality of L2P map segments is stored in the L2P map data storage 140. The map data storage 220 may unmap the L2P map data under control of the map data manager 210.

The map data storage 220 may store the P2L map data generated based on the logical address received from the map data manager 210.

For example, when the request received by the map data manager 210 from the host 300 is the write request, the P2L map data may indicate a mapping relationship between a physical address indicating a location where write data according to the write request is stored and the received logical address. In an embodiment, when the request received by the map data manager 210 from the host 300 is the unmap request, the P2L map data may indicate a mapping relationship between unmap data and the received logical address.

The map data storage 220 may store the P2L map data by a unit of a P2L map data segment of a predetermined size. Therefore, the map data storage 220 may store the P2L map data as at least one map segment.

The map data storage 220 may include a preset number of slots that stores the map segment. The map data storage 220 may record a start point and an end point of the map segments to be stored, through an index indicating each slot.

In an embodiment, the map data storage 220 may store a new map segment sequentially from the recorded end point and update the end point. The map data storage 220 may flush the map segment stored sequentially from the recorded start point and update the start point.

The map data storage 220 may store the P2L map data represented by length information of continuous physical addresses mapped to the logical address. For example, when the physical addresses mapped to the logical address are continuous, the map data storage 220 may store the length information indicating a start address of the continuous physical addresses and the number of continuous physical addresses.

The map data storage 220 may flush all or some of the P2L map data stored in the map data storage 220 under the control of the map data manager 210. The map data storage 220 may provide the flushed P2L map data to the map update buffer 230.

The map update buffer 230 may receive L2P map data to be updated among the L2P map data stored in the L2P map data storage 140 from the memory device 100 and store the L2P map data to be updated.

The map update buffer 230 updates the L2P map data based on the flushed P2L map data under the control of the map data manager 210, and provides the updated L2P map data to the memory device 100.

The host 300 may communicate with the storage device 50 using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

Figure 2:
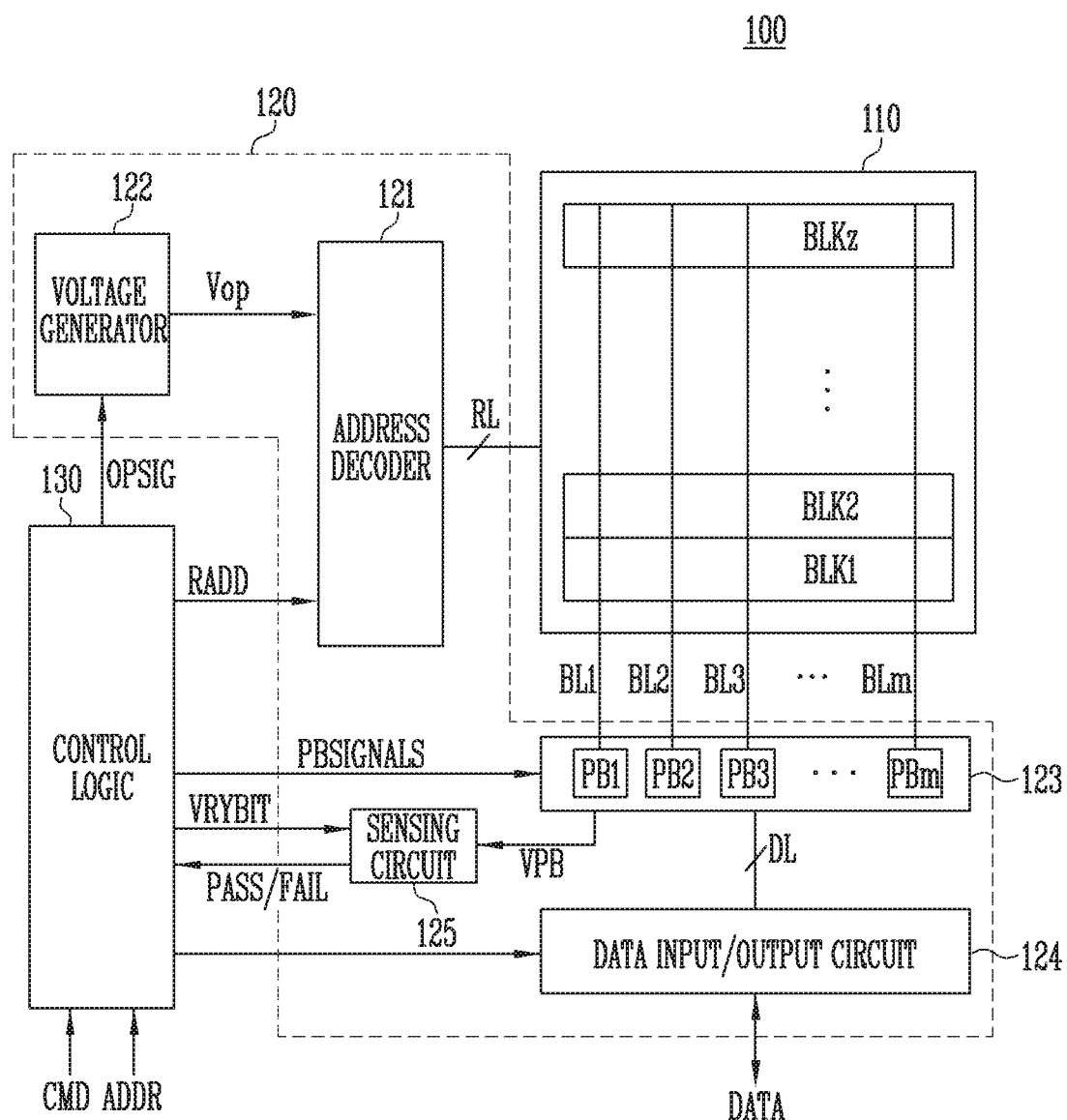
FIG. 2 is diagram for describing a structure of a memory device of FIG. 1.

FIG. 2 is diagram for describing a structure of the memory device of FIG. 1.

Referring to FIG. 2, a memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are connected to an address decoder 121 through row lines RL. The plurality of memory blocks BLK1 to BLKz are connected to a read and write circuit 123 through bit lines BL1 to BLm. Each of the plurality of memory blocks BLK1 to BLKz includes a plurality of memory cells. As an embodiment, the plurality of memory cells are non-volatile memory cells. Memory cells connected to the same word line among the plurality of memory cells are defined as one physical page. That is, the memory cell array 110 is configured of a plurality of physical pages. According to an embodiment of the present disclosure, each of the plurality of memory blocks BLK1 to BLKz included in the memory cell array 110 may include a plurality of dummy cells. At least one of the dummy cells may be connected in series between a drain select transistor and the memory cells, and between a source select transistor and the memory cells.

Each of the memory cells of the memory device 100 may be configured as a single level cell (SLC) that stores one data bit, a multi-level cell (MLC) that stores two data bits, a triple level cell (TLC) that stores three data bits, or a quad level cell (QLC) that stores four data bits.

The peripheral circuit 120 may include an address decoder 121, a voltage generator 122, the read and write circuit 123, a data input/output circuit 124, and a sensing circuit 125.

The peripheral circuit 120 drives the memory cell array 110. For example, the peripheral circuit 120 may drive the memory cell array 110 to perform a program operation, a read operation, and an erase operation.

The address decoder 121 is connected to the memory cell array 110 through the row lines RL. The row lines RL may include drain select lines, word lines, source select lines, and a common source line. According to an embodiment of the present disclosure, the word lines may include normal word lines and dummy word lines. According to an embodiment of the present disclosure, the row lines RL may further include a pipe select line.

In an embodiment, the row lines RL may be local lines included in local line groups. The local line group may correspond to one memory block. The local line group may include the drain select line, local word lines, and the source select line.

The address decoder 121 is configured to operate in response to control of the control logic 130. The address decoder 121 receives an address ADDR from the control logic 130.

The address decoder 121 is configured to decode a block address of the received address ADDR. The address decoder 121 selects at least one memory block among the memory blocks BLK1 to BLKz according to the decoded block address. The address decoder 121 is configured to decode a row address RADD of the received address ADDR. The address decoder 121 may select at least one word line of a selected memory block by applying voltages supplied from the voltage generator 122 to at least one word line WL according to the decoded row address RADD.

During the program operation, the address decoder 121 may apply a program voltage to a selected word line and apply a pass voltage having a level less than that of the program voltage to unselected word lines. During a program verify operation, the address decoder 121 may apply a verify voltage to the selected word line and apply a verify pass voltage having a level greater than that of the verify voltage to the unselected word lines.

During the read operation, the address decoder 121 may apply a read voltage to the selected word line and apply a read pass voltage having a level greater than that of the read voltage to the unselected word lines.

According to an embodiment of the present disclosure, the erase operation of the memory device 100 is performed in memory block units. The address ADDR input to the memory device 100 during the erase operation includes a block address. The address decoder 121 may decode the block address and select one memory block according to the decoded block address. During the erase operation, the address decoder 121 may apply a ground voltage to the word lines input to the selected memory block.

According to an embodiment of the present disclosure, the address decoder 121 may be configured to decode a column address of the transferred address ADDR. The decoded column address may be transferred to the read and write circuit 123. As an example, the address decoder 121 may include a component such as a row decoder, a column decoder, and an address buffer.

The voltage generator 122 is configured to generate a plurality of operation voltages Vop by using an external power voltage supplied to the memory device 100. The voltage generator 122 operates in response to the control of the control logic 130.

As an example, the voltage generator 122 may generate an internal power voltage by regulating the external power voltage. The internal power voltage generated by the voltage generator 122 is used as an operation voltage of the memory device 100.

As an embodiment, the voltage generator 122 may generate the plurality of operation voltages Vop using the external power voltage or the internal power voltage. The voltage generator 122 may be configured to generate various voltages required by the memory device 100. For example, the voltage generator 122 may generate a plurality of erase voltages, a plurality of program voltages, a plurality of pass voltages, a plurality of selection read voltages, and a plurality of non-selection read voltages.

In order to generate the plurality of operation voltages Vop having various voltage levels, the voltage generator 122 may include a plurality of pumping capacitors that receive the internal voltage and selectively activate the plurality of pumping capacitors to generate the plurality of operation voltages Vop.

The plurality of operation voltages Vop may be supplied to the memory cell array 110 by the address decoder 121.

The read and write circuit 123 includes first to m-th page buffers PB1 to PBm. The first to m-th page buffers PB1 to PBm are connected to the memory cell array 110 through first to m-th bit lines BL1 to BLm, respectively. The first to m-th page buffers PB1 to PBm operate in response to the control of the control logic 130.

The first to m-th page buffers PB1 to PBm communicate data DATA with the data input/output circuit 124. At a time of a program operation, the first to m-th page buffers PB1 to PBm receive the data DATA to be stored through the data input/output circuit 124 and data lines DL.

During the program operation, when a program pulse is applied to the selected word line, the first to m-th page buffers PB1 to PBm may transfer the data DATA to be stored, that is, the data DATA received through the data input/output circuit 124 to the selected memory cells through the bit lines BL1 to BLm. The memory cells of the selected page are programmed according to the transferred data DATA. A memory cell connected to a bit line to which a program permission voltage (for example, a ground voltage) is applied may have an increased threshold voltage. A threshold voltage of a memory cell connected to a bit line to which a program inhibition voltage (for example, a power voltage) is applied may be maintained. During the program verify operation, the first to m-th page buffers PB1 to PBm read the data DATA stored in the memory cells from the selected memory cells through the bit lines BL1 to BLm.

During the read operation, the read and write circuit 123 may read the data DATA from the memory cells of the selected page through the bit lines BL and store the read data DATA in the first to m-th page buffers PB1 to PBm.

During the erase operation, the read and write circuit 123 may float the bit lines BL. As an embodiment, the read and write circuit 123 may include a column selection circuit.

The data input/output circuit 124 is connected to the first to m-th page buffers PB1 to PBm through the data lines DL. The data input/output circuit 124 operates in response to the control of the control logic 130.

The data input/output circuit 124 may include a plurality of input/output buffers (not shown) that receive input data DATA. During the program operation, the data input/output circuit 124 receives the data DATA to be stored from an external controller (not shown). During the read operation, the data input/output circuit 124 outputs the data DATA transferred from the first to m-th page buffers PB1 to PBm included in the read and write circuit 123 to the external controller.

During the read operation or the verify operation, the sensing circuit 125 may generate a reference current in response to a signal of a permission bit VRYBIT generated by the control logic 130 and may compare a sensing voltage VPB received from the read and write circuit 123 with a reference voltage generated by the reference current to output a pass signal or a fail signal to the control logic 130.

The control logic 130 may be connected to the address decoder 121, the voltage generator 122, the read and write circuit 123, the data input/output circuit 124, and the sensing circuit 125. The control logic 130 may be configured to control all operations of the memory device 100. The control logic 130 may operate in response to a command CMD transferred from an external device.

The control logic 130 may generate various signals in response to the command CMD and the address ADDR to control the peripheral circuit 120. For example, the control logic 130 may generate an operation signal OPSIG, the row address RADD, a read and write circuit control signal PBSIGNALS, and the permission bit VRYBIT in response to the command CMD and the address ADDR. The control logic 130 may output the operation signal OPSIG to the voltage generator 122, output the row address RADD to the address decoder 121, output the read and write control signal to the read and write circuit 123, and output the permission bit VRYBIT to the sensing circuit 125. In addition, the control logic 130 may determine whether the verify operation has passed or failed in response to the pass or fail signal PASS/FAIL output by the sensing circuit 125.

In an embodiment, the L2P map data storage described with reference to FIG. 1 may correspond to a meta area storing meta data of the memory cell array 100. Each meta area may correspond to one memory cell, a plurality of memory cells, one page, a plurality of pages, one memory block, or a plurality of memory blocks.

Figure 3:
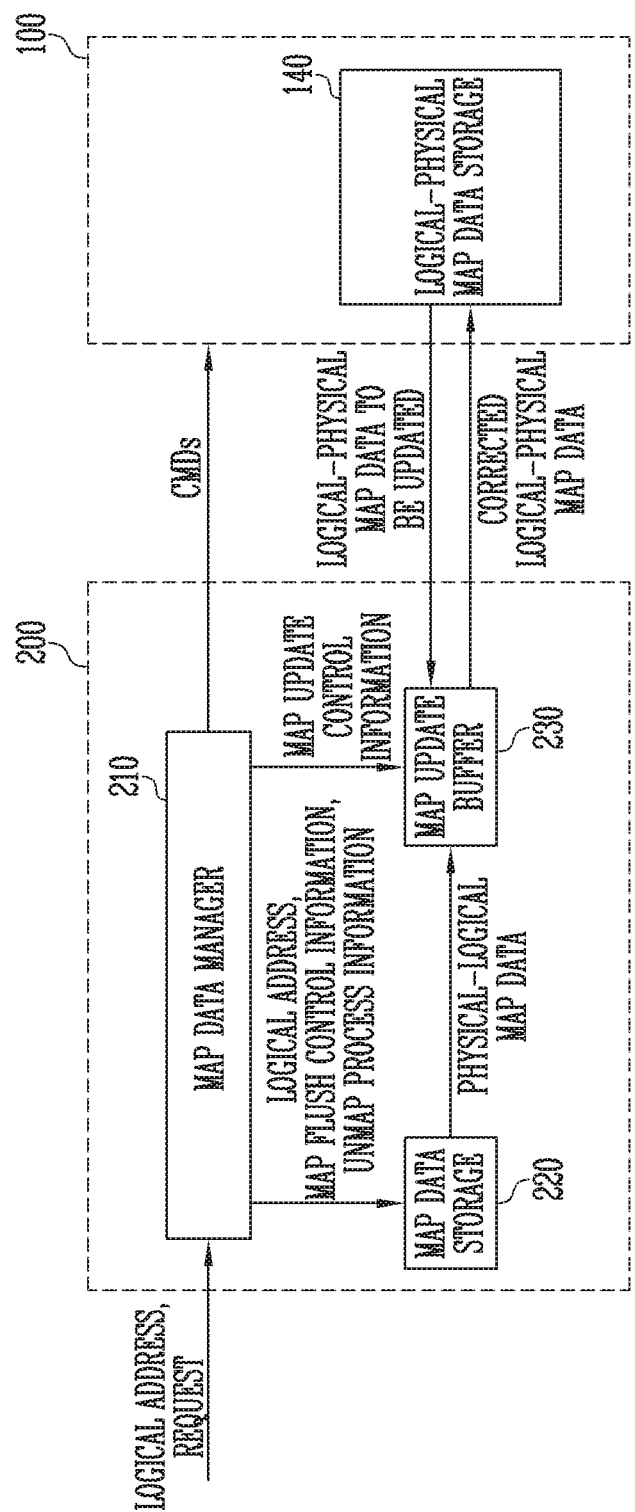
FIG. 3 is a diagram for describing a configuration and an operation of the memory controller of FIG. 1.

FIG. 3 is a diagram for describing a configuration and an operation of the memory controller of FIG. 1.

Referring to FIG. 3, the memory device 100 may include the L2P map data storage 140.

The L2P map data storage 140 may store L2P map data indicating a mapping relationship between a logical address of data provided by the host and a physical address of the memory device 100 in which the data is stored.

The L2P map data storage 140 may store a plurality of L2P map segments. Each L2P map segment may have a predetermined size. One L2P map segment may include L2P map data indicating mapping relationships between a plurality of logical addresses and a plurality of physical addresses.

The memory controller 200 may include a map data manager 210, a map data storage 220, and a map update buffer 230.

The map update buffer 230 may receive L2P map data to be updated among the L2P map data stored in the L2P map data storage 140 from the memory device 100 and store the L2P map data to be updated.

When the map update buffer 230 receives map update control information, the map update buffer 230 may update the L2P map data based on flushed P2L map data provided from a P2L map table storage 222 (see FIG. 4). The map update buffer 230 may provide the updated L2P map data to the memory device 100.

The map data manager 210 may receive a logical address corresponding to the request together with the request from the host 300. The request may be any one of a write request and an unmap request. The map data manager 210 may provide the logical address received from the host 300 to the map data storage 220.

The map data manager 210 may generate unmap process information for unmapping a map data address of the L2P map data stored in a L2P map management table storage 221 (see FIG. 4). The map data manager 210 may provide the unmap process information to the L2P map management table storage 221.

The map data manager 210 may generate map flush control information for flushing, into the map update buffer 230, the P2L map data stored in the P2L map table storage 222. The map data manager 210 may provide the map flush control information to the P2L map table storage 222.

The map data manager 210 may generate map update control information for updating the L2P map data stored in the L2P map data storage 140 based on the P2L map data flushed from the P2L map table storage 222. The map data manager 210 may provide the map update control information to the map update buffer 230. The map update buffer 230 updates the L2P map data stored in the L2P map data storage 140 based on the P2L map data flushed from the P2L map table storage 222 in response to the map update control information.

The map data manager 210 may provide a read command for reading the L2P map data to be updated among the L2P map data stored in the L2P map data storage 140, to the memory device 100.

The map data manager 210 may provide the memory device 100 with a program command for storing the updated L2P map data stored in the map update buffer 230 into the L2P map data storage 140.

The map data storage 220 may include the L2P map management table storage 221 and the P2L map table storage 222.

The L2P map management table storage 221 may store map data addresses indicating locations where a plurality of L2P map segments are stored within the L2P map data storage 140.

The L2P map management table storage 221 may unmap the map data address of the L2P map segment in response to the unmap process information.

The P2L map table storage 222 may store the P2L map data generated based on the logical address received from the map data manager 210.

For example, when the request received by the map data manager 210 from the host 300 is the write request, the P2L map table storage 222 may store the P2L map data indicating a mapping relationship between the physical address indicating a location where the write data according to the write request is stored and the received logical address. When the request received by the map data manager 210 from the host 300 is the unmap request, the P2L map table storage 222 may store the P2L map data indicating the mapping relationship between the unmap data and the received logical address.

The P2L map table storage 222 may store the P2L map data by a unit of a P2L map data segment having a predetermined size. One map segment may include at least one or more map data chunks. One map data chunk may be data indicating a mapping relationship between one logical address and one physical address. Therefore, the P2L map table storage 222 may store the P2L map data by units of P2L map segments.

The P2L map table storage 222 may include a preset number of slots that stores the P2L map segment. The P2L map table storage 222 may record the start point and the end point of the stored P2L map segments, through an index indicating each slot. The start point may be an index of a slot that stores a first P2L map segment among the at least one P2L map segment. The end point may be an index of a slot that stores a last P2L map segment among the at least one P2L map segment.

The P2L map table storage 222 may update the end point when storing (en-queueing) a new P2L map segment in the slot. The P2L map table storage 222 may update the start point when flushing (de-queueing) the P2L map segment stored in the slot.

The P2L map table storage 222 may store the P2L map data represented by length information of continuous physical addresses mapped to the logical address. For example, when the physical addresses mapped to the logical address are continuous, the P2L map table storage 222 may store the length information indicating the start address of the continuous physical addresses and the number of continuous physical addresses.

When the P2L map table storage 222 receives map flush control information, the P2L map table storage 222 may flush the entire or some of the P2L map data stored in the P2L map table storage 222. A size of the flushed P2L map data may be variously set according to the request of the host or an operation environment of a storage device. The P2L map table storage 222 may provide the flushed P2L map data to the map update buffer 230.

FIG. 4 is a diagram for describing the map data storage of FIG. 3.

Referring to FIG. 4, the map data storage 220 may include the L2P map management table storage 221 and the P2L map table storage 222.

The L2P map management table storage 221 may store the map data addresses indicating locations where the plurality of L2P map segments are stored. The L2P map segment may include map data indicating mapping relationships between logical addresses and physical addresses of data stored in the memory device 100.

The L2P map management table storage 221 may change the map data address of the unmap-requested L2P map segment to unmap data in response to the unmap process information.

The P2L map table storage 222 may store the P2L map data generated based on the logical address received from the map data manager 210.

In an embodiment, the P2L map data may indicate a mapping relationship between a physical address indicating a location where write data according to the write request is stored and the received logical address. In another embodiment, the P2L map data may indicate a mapping relationship between the unmap data and the received logical address.

The P2L map table storage 222 may store the P2L map data by a unit of a P2L map data segment having a predetermined size. Therefore, the P2L map table storage 222 may store the P2L map data as at least one P2L map segment.

The P2L map table storage 222 may include a preset number of slots that store the P2L map segment. The preset number may be variously determined according to the operation environment of the storage device described with reference to FIG. 1. The P2L map table storage 222 may record the start point and the end point of the stored P2L map segments, through an index indicating each slot.

For example, when the P2L map table storage 222 sequentially stores at least one P2L map segment, the P2L map table storage 222 may record a start point and an end point of the at least one P2L map segment. The start point may be an index of a slot that stores a first P2L map segment among the at least one P2L map segment. The end point may be an index of a slot that stores a last P2L map segment among the at least one P2L map segment.

In an embodiment, the P2L map table storage 222 may store the P2L map segments sequentially from a first slot. The P2L map table storage 222 may store a new P2L map segment sequentially from the first slot again when all previously stored P2L map segments are flushed.

In this manner, the P2L map table storage 222 may manage the P2L map segment in a linear structure. A detailed description of the linear structure will be described later with reference to FIG. 10.

In another embodiment, the P2L map table storage 222 may store a new P2L map segment sequentially from the recorded end point. Thereafter, the P2L map table storage 222 may update the end point through an index of a slot in which the new P2L map segment is stored. When the P2L map segment is stored in the last slot, the P2L map table storage 222 may store a new P2L map segment from the first slot again.

The P2L map table storage 222 may flush the P2L map segment sequentially stored from the recorded start point. Thereafter, the P2L map table storage 222 may update the start point to an index of a slot in which a first P2L map segment among the P2L map segments remaining in the P2L map table storage 222 after the flush of the P2L map segment.

In this manner, the P2L map table storage 222 may manage the P2L map segment in a circular structure. A detailed description of the circular structure will be described later with reference to FIG. 12.

The P2L map table storage 222 may store the P2L map data represented by the length information of the continuous physical addresses mapped to the logical address. For example, when the physical addresses mapped to the logical address are continuous, the P2L map table storage 222 may store the length information indicating the start address of the continuous physical address and the number of continuous physical addresses. A detailed description of the length information will be described later with reference to FIGS. 8A to 8C.

When the P2L map table storage 222 receives the map flush control information, the P2L map table storage 222 may flush at least one P2L map segment that is a part of all of the plurality of P2L map segments stored in a plurality of slots. The P2L map table storage 222 may provide the flushed at least one P2L map segment to the map update buffer described with reference to FIG. 3. The P2L map table storage 222 may empty slots that store the flushed at least one P2L map segment.

FIG. 5 is a diagram for describing the L2P map management table of FIG. 4.

Referring to FIG. 5, the L2P map management table may include a map data address indicating a location where a L2P map segment is stored. In an embodiment, the L2P map management table may refer as L1 Table. When the memory controller reads data stored in a location corresponding to the map data address, the memory controller may acquire the L2P map segment stored in the L2P map data storage 140. One L2P map segment may include a plurality of pieces of L2P map data indicating a mapping relationship between the logical address and the physical address of the data stored in the memory device.

In FIG. 5, the L2P map management table may include first to fourth map data addresses Addr1 to Addr4 indicating locations where first to fourth L2P map segments Map Seg1 to Map Seg4 are stored within the L2P map data storage 140, respectively.

The map data address of the L2P map segment requested to be unmapped from the host may be changed to the unmap data. The unmap data may have a predetermined bit-pattern representing a particular value. When the map data address is changed to the unmap data, an unmap process operation may be performed on all of the plurality of pieces of L2P map data included in the unmap-requested L2P map segment.

Therefore, when a size of the unmap-requested L2P map segment is large, the unmap process operation for the L2P map segment may be performed more quickly and efficiently than unmap process operation for an individual L2P map data indicating a mapping relationship between one logical address and one physical address.

For example, the unmap request may be requested for all L2P map data included in the fourth L2P map segment Map Seg4. Alternatively, the unmap request may be requested for the fourth L2P map segment Map Seg4 itself. In this case, in the L2P map management table, the fourth map data address Addr4 indicating the location where the fourth L2P map segment Map Seg4 is stored in the memory device may be changed to the unmap data Unmap.

By changing the fourth map data address Addr4 to the unmap data, the unmap process operation may be performed more quickly than individually performing the unmap process operation on all logical addresses included in the fourth L2P map segment Map Seg4.

Figure 6:
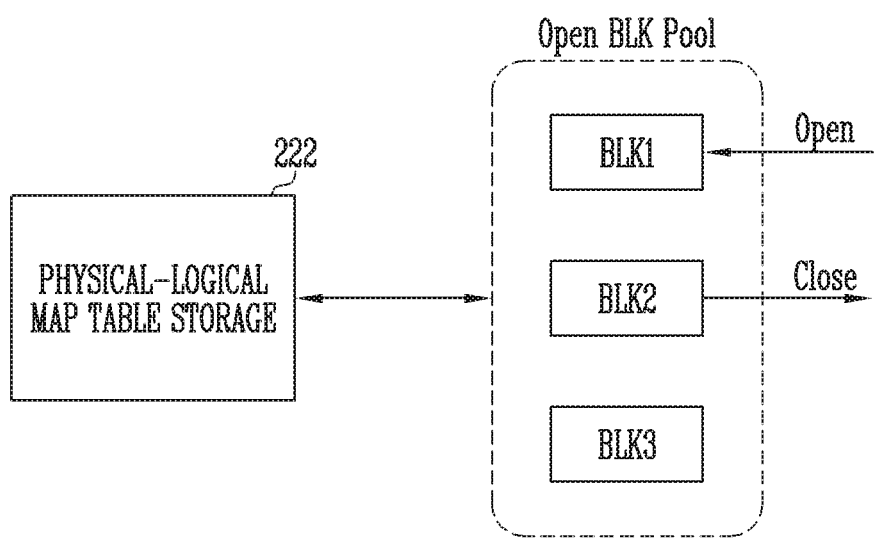
FIG. 6 is a diagram for describing a P2L map table storage of FIG. 4.

FIG. 6 is a diagram for describing the P2L map table storage of FIG. 4.

Referring to FIG. 6, an open block pool may include a preset number of open blocks.

The open block may correspond to one memory block to store data. Alternatively, the open block may correspond to one super block to store data. The super block may be a group of at least two memory blocks included in different memory devices among a plurality of memory devices.

The P2L map table storage 222 may store P2L map data indicating a mapping relationship between physical addresses of open blocks in which write data is stored and a logical address of the write data.

In FIG. 6, the open block pool may include first to third open blocks BLK1 to B3. The number of open blocks included in the open block pool is not limited to the present embodiment.

An open operation Open may be an operation of allocating a memory block for storing data to the open block pool. A close operation Close may be an operation of releasing a memory block in which data writing is completed from the open block pool.

The first open block BLK1 may be allocated to store data. The second open block BLK2 may be released because data is fully written thereto. When one memory block is released from the open block pool, another memory block for storing data may be newly allocated to the open block pool.

Figures 7C, 8A:
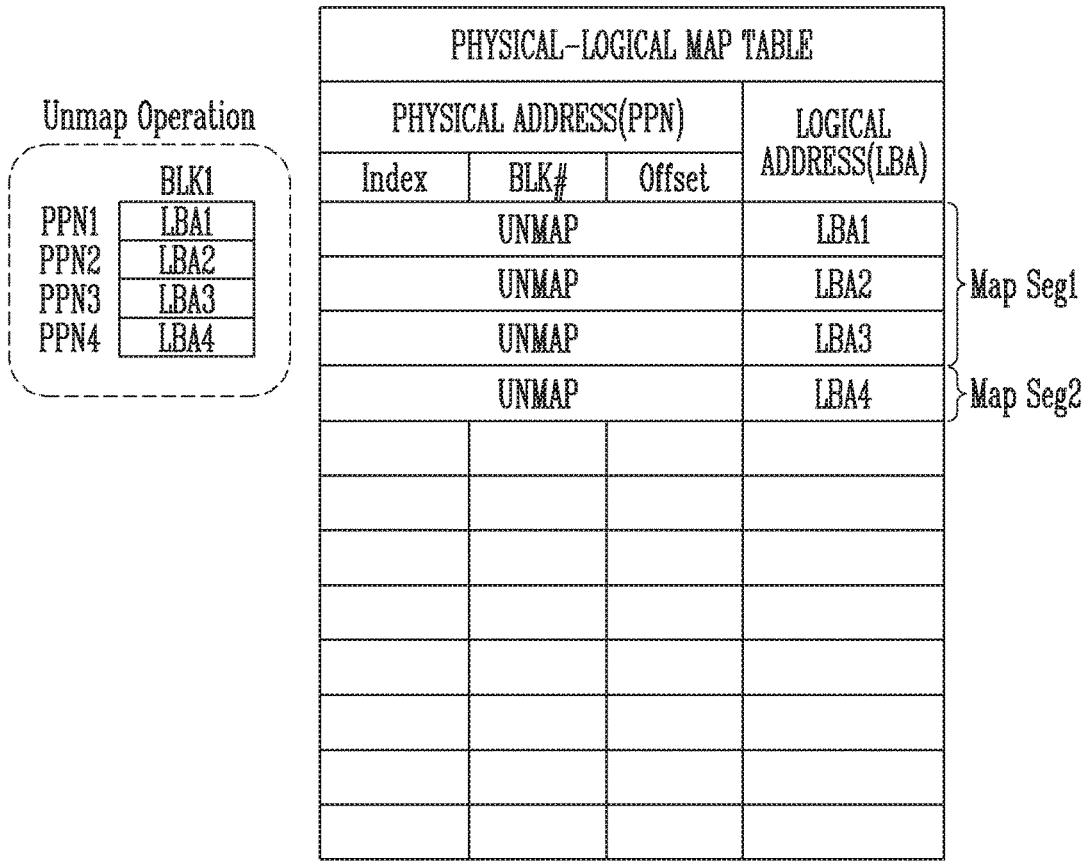

FIGS. 7A to 7C are diagrams for describing the P2L map table of FIG. 4 according to an embodiment.

FIG. 7A is a diagram for describing a P2L map table at a time when data is sequentially written to the open block.

The P2L map table may include map data indicating a mapping relationship between a physical address (physical page number) PPN in which write data is stored and a logical address (logical block address) LBA of write data provided by a host. The physical address PPN may include a block number BLK # including a physical page and an offset Offset indicating a location of a physical page in the block.

In FIG. 7A, one open block may include four physical pages. The number of physical pages included in the open block is not limited to the present embodiment. One P2L map segment may include three pieces of map data indicating a mapping relationship between one logical address and one physical address. The number of pieces of map data included in the P2L map segment is not limited to the present embodiment.

In various embodiments, the number of physical addresses included in one P2L map segment may be different from the number of physical addresses included in one open block. That is, when the number of physical addresses included in one P2L map segment is less than the number of physical addresses included in one open block, several P2L map segments may correspond to one open block. In contrast, when the number of physical addresses included in one P2L map segment is greater than the number of physical addresses included in one open block, several open blocks may correspond to one P2L map segment. In another embodiment, the number of physical addresses included in one P2L map segment may be the same as the number of physical addresses included in one open block. In this case, one open block may correspond to one P2L map segment, one-to-one.

A capacity of the P2L map table may be variously set according to an operation environment of a storage device. In FIG. 7A, the capacity of the P2L map table may be a size capable of storing map data corresponding to three open blocks. In this case, the P2L map table may manage map data corresponding to three open blocks. In various embodiments, the capacity of the P2L map table may be a size capable of storing map data corresponding to one open block. The P2L map table may correspond to one open block, one-to-one, to manage map data.

Continuous logical addresses LBA1 to LBA12 may be provided in which write data is to be stored together with the write data from the host. A write operation of storing write data in the first to third open blocks BLK1 to BLK3 may be performed. The write operation may be sequentially performed in order of the first open block BLK1, the second open block BLK2, and the third open block BLK3.

Therefore, the write data is sequentially stored in the physical addresses PPN1 to PPN4 of the first open block BLK1, and the physical addresses PPN1 to PPN4 may be mapped to the logical addresses LBA1 to LBA4 one-to-one, respectively.

Specifically, since the physical address PPN1 has a block number BLK # of 1 and an offset Offset of 1, the physical address PPN1 may be an address of a first physical page included in the first open block BLK1. When write data corresponding to the logical address LBA1 is stored in the physical address PPN1, mapping data indicating a mapping relationship between the physical address PPN1 and the logical address LBA1 may be generated. In the same manner, mapping data indicating a mapping relationship between the physical addresses PPN2 to PPN4 and the logical addresses LBA2 to 4 may be generated.

Thereafter, write data may be sequentially stored in the physical addresses PPN5 to PPN8 of the second open block BLK2, and the physical addresses PPN5 to PPN8 may be mapped to the logical addresses LBA5 to LBA8 one-to-one, respectively. The write data may be sequentially stored in the physical addresses PPN9 to PPN12 of the third open block BLK3, and the physical addresses PPN9 to PPN12 may be mapped to the logical addresses LBA9 to LBA12 one-to-one, respectively.

In FIG. 7A, the physical logical map segment Map Seg1 may include map data regarding the logical addresses LBA1 to LBA3. The physical logical map segment Map Seg2 may include map data regarding the logical addresses LBA4 to LBA6. The physical logical map segment Map Seg3 may include map data regarding the logical addresses LBA7 to LBA9. The physical logical map segment Map Seg4 may include map data regarding the logical addresses LBA10 to LBA12.

The P2L map segment included in the P2L map table may be generated by a method in which a logical address is mapped to a physical address indicating a location where write data is stored, and may be arranged based on the physical address.

The L2P map segment stored in the memory device 100 may be L2P map data indicating a mapping relationship between a physical address indicating a location where write data is stored and the logical address. The L2P map segment may be arranged based on the logical address.

Therefore, the P2L map segment and the L2P map segment may be managed by a unit of a map segment, but may be map data of which arrangement references are different from the physical address and the logical address, respectively. One map segment may include a predetermined number of pieces of map data indicating a mapping relationship between one logical address and one physical address.

FIG. 7B is a diagram for describing a P2L map table at a time when data is written to the open block.

Referring to FIG. 7B, write data corresponding to the logical addresses LBA1 to 12 may be written to the first to third open blocks BLK1 to BLK3 in a different order from that of FIG. 7A.

Even though the logical addresses provided from the host are continuous, continuity of physical addresses in which write data corresponding to logical addresses is stored may not be guaranteed. In other words, according to the operation environment of the storage device, the write operation may be continuously performed on any one open block and the write operation may be performed on another open block in the middle.

For example, write data corresponding to the logical addresses LBA1 and LBA2 may be sequentially stored in the physical addresses PPN1 and PPN2 of the first open block BLK1, and the physical addresses PPN1 and PPN2 may be mapped to logical addresses LBA1 and LBA2 one-to-one, respectively.

Thereafter, the write operation is not continuously performed on the remaining physical addresses PPN3 and PPN4 of the first open block BLK1, and the write operation may be performed on the physical addresses PPN5 to PPN8 of the second open block BLK2.

Therefore, write data corresponding to the logical addresses LBA3 to LBA6 may be stored in the physical addresses PPN5 to PPN8 of the second open block BLK2, and the physical addresses PPN5 to PPN8 may be mapped to the logical address LBA3 to LBA6 one-to-one, respectively.

Write data corresponding to the logical addresses LBA7 and LBA8 may be stored in the remaining physical addresses PPN3 and PPN4 of the first open block BLK1, and the physical addresses PPN3 and PPN4 may be mapped to the logical addresses LBA7 and LBA8 one-to-one, respectively.

Write data corresponding to the logical addresses LBA9 to LBA12 may be stored in the physical addresses PPN9 to PPN12 of the third open block BLK3, and the physical addresses PPN9 to PPN12 may be mapped to the logical addresses LBA9 to LBA12 one-to-one, respectively.

In comparison with FIG. 7A, storing write data corresponding to the continuous logical addresses LBA1 to LBA12 in the first to third open blocks BLK1 to BLK3 is the same, but the P2L map data may be generated differently according to the order in which the write operations are performed.

FIG. 7C is a diagram for describing a P2L map table during an unmap operation.

Referring to FIG. 7C, after the write operation for the first to third open blocks BLK1 to BLK3 described with reference to FIG. 7A is completed, an unmap operation for the first open block BLK1 may be performed.

The unmap operation may be an operation of disconnecting the mapping relationship between the logical address and the physical address. Specifically, the unmap operation may be an operation of changing the physical address mapped to the logical address to the unmap data.

In FIG. 7, an unmap may be requested to the logical addresses LBA1 to LBA4 mapped to the physical addresses PPN1 to PPN4 of the physical pages included in the first open block. The unmap-requested logical addresses LBA1 to LBA4 may be mapped to the unmap data instead of the physical address indicating a location where the write data is stored. The logical addresses LBA1 to LBA4 mapped to the unmap data may be recognized as a region in which write data is erased in the host and the storage device.

In various embodiments, while an erase operation is performed on the memory block, the unmap operation for the memory block may also be performed. However, a time point at which the erase operation is actually performed and a time point at which the unmap operation is performed by receiving the unmap request for the logical addresses from the host may be different from each other.

FIGS. 8A to 8C are diagrams for describing the P2L map table of FIG. 4, according to another embodiment.

FIG. 8A is a diagram for describing a P2L map table at a time when data is sequentially written to the open block.

Referring to FIG. 8A, in comparison with FIG. 7A, the P2L map table may manage the P2L map data represented by length information Length of continuous physical addresses mapped to logical addresses.

Therefore, in FIG. 8A, the physical address PPN may include a start address of the continuous physical addresses where write data is stored and a length of the continuous physical addresses (the number of continuous physical addresses). The physical address may include a block number BLK # including a physical page and an offset Offset indicating a location of a physical page in a corresponding block.

In addition, the P2L map table may manage the P2L map data by a unit of a P2L map data segment. The map data may include a physical start address that is the start address of the continuous physical addresses, length information that is the number of the continuous physical addresses, and a logical start address that is a start address of continuous logical addresses corresponding to the physical addresses. The logical addresses LBA1 to LBA12 may be mapped to the physical addresses PPN1 to PPN12.

For example, the first P2L map segment Map Seg1 may include map data corresponding to the logical addresses LBA1 to LBA3. The logical addresses LBA1 to LBA3 may be mapped to the continuous physical addresses PPN1 to PPN3. Therefore, the first P2L map segment Map Seg1 may include map data having a physical start address of PPN1, length information of 3, and a logical start address of LBA1. Thus, in contrast to FIG. 7A, through the length information, the same map data may be expressed with less data.

Although write data corresponding to the continuous logical addresses LBA1 to LBA4 are stored in the continuous physical addresses PPN1 to PPN4, since the P2L map data is managed by a unit of a P2L map data segment, map data corresponding to the logical address LBA4 included in the second P2L map segment Map Seg2 may be separately generated.

The second P2L map segment Map Seg2 may include map data corresponding to the logical addresses LBA4 to LBA6. The physical addresses PPN4 to PPN6 may be mapped to the logical addresses LBA4 to LBA6. The logical addresses LBA4 to LBA6 are continuous, but the physical addresses PPN4 to PPN6 may not be continuous.

Specifically, the physical address PPN4 may be a physical address corresponding to the first open block BLK1, but the physical addresses PPN5 and PPN6 are physical addresses corresponding to the second open block BLK2, and thus physical addresses corresponding to different open blocks may not be continuous with each other.

Therefore, the second P2L map segment Map Seg2 may include two pieces of map data. One map data may have a physical start address of PPN4, length information of 1, and a logical start address of LBA4. The other map data may have a physical start address of PPN5, length information of 2, and a logical start address of LBA5.

In a similar manner, the third P2L map segment Map Seg3 may include map data corresponding to the logical addresses LBA7 to LBA9. The third P2L map segment Map Seg3 may include two pieces of map data. One map data may have a physical start address of PPN7, length information of 2, and a logical start address of LBA7. The other map data may have a physical start address of PPN9, length information of 1, and a logical start address of LBA9.

The fourth P2L map segment Map Seg4 may include map data corresponding to the logical addresses LBA10 to LBA12. The fourth P2L map segment Map Seg4 may include one map data. The map data may have a physical start address of PPN10, length information of 3, and a logical start address of LBA10.

In the case of FIG. 8A, in contrast to FIG. 7A, through the length information, the same map segment may be expressed with a less number of pieces of map data. Therefore, the P2L map table of a limited size may be utilized more efficiently.

FIG. 8B is a diagram for describing a P2L map table at a time when data is written to the open block.

Referring to FIG. 8B, when a write operation is performed in the same manner as in FIG. 7B, the P2L map table includes P2L map data generated in the same manner as in FIG. 8A.

The first P2L map segment Map Seg1 may include map data corresponding to the logical addresses LBA1 to LBA3. The first P2L map segment Map Seg1 may include two pieces of map data. One map data may have a physical start address of PPN1, length information of 2, and a logical start address of LBA1. The other map data may have a physical start address of PPN5, length information of 1, and a logical start address of LBA3. Since the physical addresses PPN1 and PPN2 and the physical address PPN5 correspond to different open blocks, the physical addresses PPN1 and PPN2 and the physical address PPN5 may not be continuous.

The second P2L map segment Map Seg2 may include map data corresponding to the logical addresses LBA4 to LBA6. The second P2L map segment Map Seg2 may include one map data. The map data may have a physical start address of PPN6, length information of 3, and a logical start address of LBA4.

The third P2L map segment Map Seg3 may include map data corresponding to the logical addresses LBA7 to LBA9. The third P2L map segment Map Seg3 may include two pieces of map data. One map data may have a physical start address of PPN3, length information of 2, and a logical start address of LBA7. The other map data may have a physical start address of PPN9, length information of 1, and a logical start address of LBA9.

The fourth P2L map segment Map Seg4 may include map data corresponding to the logical addresses LBA10 to LBA12. The fourth P2L map segment Map Seg4 may include one map data. The map data may have a physical start address of PPN10, length information of 3, and a logical start address of LBA10.

FIG. 8C is a diagram for describing a P2L map table during an erase operation.

Referring to FIG. 8C, when an erase operation is performed in the same manner as in FIG. 7C, the P2L map table includes the P2L map data generated in the same manner as in FIG. 8A. An unmap request for the continuous logical addresses LBA1 to LBA4 may be provided from the host.

In the P2L map table, the physical address mapped to the unmap-requested logical address may be changed to the unmap data. Therefore, the length information in the unmap process operation may indicate the length of the unmap-requested continuous logical address in the P2L map table.

The P2L map table may manage the P2L map data by a unit of a P2L map data segment even in the unmap process operation.

The first P2L map segment Map Seg1 may include map data corresponding to the logical addresses LBA1 to LBA3. The map data may include the unmap data and 3 that is length information of the unmap-requested consecutive logical addresses LBA1 to LBA3.

The second P2L map segment Map Seg2 may include map data for the unmap-requested logical address LBA4 among the logical addresses LBA4 to LBA6. The map data may include the unmap data and 1 that is length information of the unmap-requested logical address LBA4.

Therefore, in contrast to FIG. 7C, through the length information, the same map data may be expressed with less data.

Figure 9:
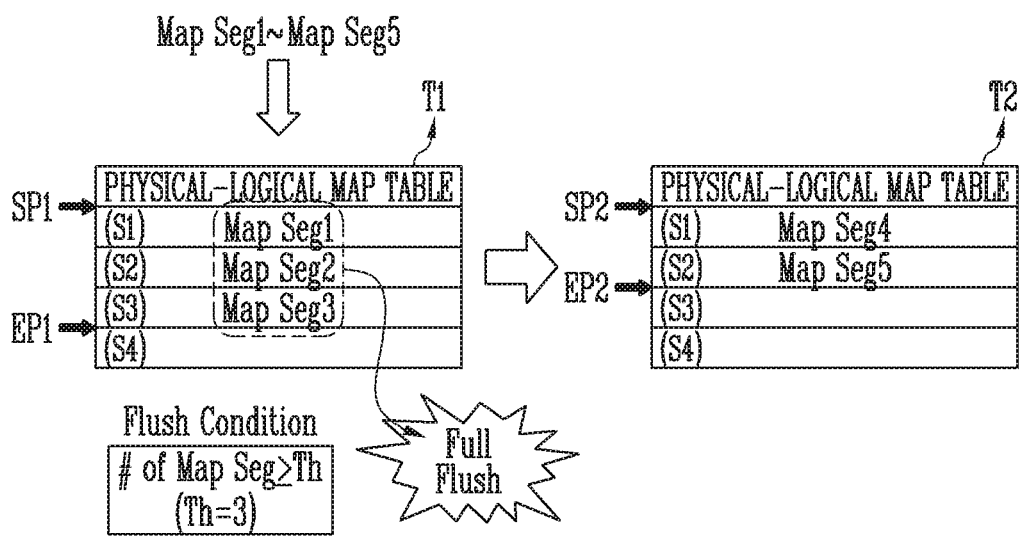
FIG. 9 is a diagram for describing a full flush operation according to an embodiment.

FIG. 9 is a diagram for describing a full flush operation according to an embodiment.

Referring to FIG. 9, the P2L map table storage may have a predetermined size. Specifically, the P2L map table storage may include slots that store a predetermined number of P2L segments.

In addition, the P2L map table storage may store or flush the P2L map data by a unit of a P2L map data segment.

When the plurality of P2L map segments are sequentially stored, a start point and an end point of the plurality of P2L map segments may be recorded. The start point may be an index of a slot that stores a first P2L map segment among the plurality of P2L map segments. The end point may be an index of a slot that stores a last P2L map segment among the plurality of P2L map segments.

In an embodiment, when the number of P2L map segments stored in the P2L map table is equal to or greater than a threshold number, a full flush operation in which all P2L map segments stored in the P2L map table are flushed may be performed.

In another embodiment, when a process expectation time for the P2L map segment stored in the P2L map table is equal to or greater than a threshold time, the full flush operation in which all P2L map segments stored in the P2L map table are flushed may be performed.

In FIG. 9, the P2L map table may include four slots S1 to S4 storing four P2L map segments. First to fifth P2L map segments Map Seg1 to Map Seg5 may be sequentially stored in the P2L map table. The threshold number at which the flush occurs may be three.

First, the first to third P2L map segments Map Seg1 to Map Seg3 may be sequentially stored in the first to third slots S1 to S3. A start point SP1 may be an index indicating the slot S1 in which the first P2L map segment Map Seg1 is stored. The first P2L map segment Map Seg1 may be a first one among the first to third P2L map segments Map Seg1 to Map Seg3. An end point EP1 may be an index indicating the slot S3 in which the third P2L map segment Map Seg3 is stored. The third P2L map segment Map Seg3 may be a last one among the first to third P2L map segments Map Seg1 to Map Seg3.

In this case, since a flush condition is satisfied, a full flush operation for all P2L map segments stored in the P2L map table may be performed.

After the full flush operation is completed, the fourth and fifth P2L map segments Map Seg4 and Map Seg5 may be sequentially stored in the first and second slots S1 and S2. A start point SP2 may be an index indicating the slot S1 in which the fourth P2L map segment Map Seg4 is stored. The fourth P2L map segment Map Seg4 may be a first one among the fourth and fifth P2L map segments Map Seg4 and Map Seg5. An end point EP2 may be an index indicating the slot S2 in which the fifth P2L map segment Map Seg5 is stored. The fifth P2L map segment Map Seg5 may be a last one among the fourth and fifth P2L map segments Map Seg4 and Map Seg5.

Figure 10:
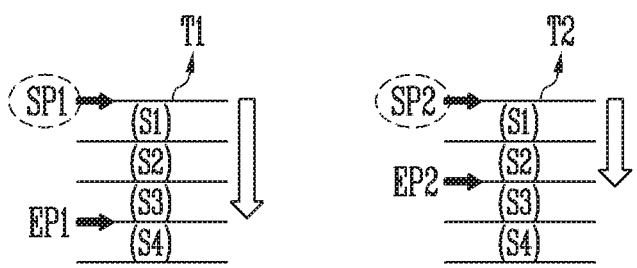
FIG. 10 is a diagram for describing a map data management structure of a P2L map table of FIG. 9.

FIG. 10 is a diagram for describing a map data management structure of the P2L map table of FIG. 9.

Referring to FIG. 10, when the full flush operation is performed, the start point SP2 and the end point EP2 may be newly recorded regardless of the previous start point SP1 and the end point EP1.

Therefore, a direction from the start point to the end point may be one direction. In the P2L map table, the P2L map segments may be managed in a linear structure.

In this case, the start point SP1 in a P2L map table T1 before the flush and the start point SP2 in a P2L map table T2 after the flush may be equally fixed to the index of the slot S1.

Figure 11:
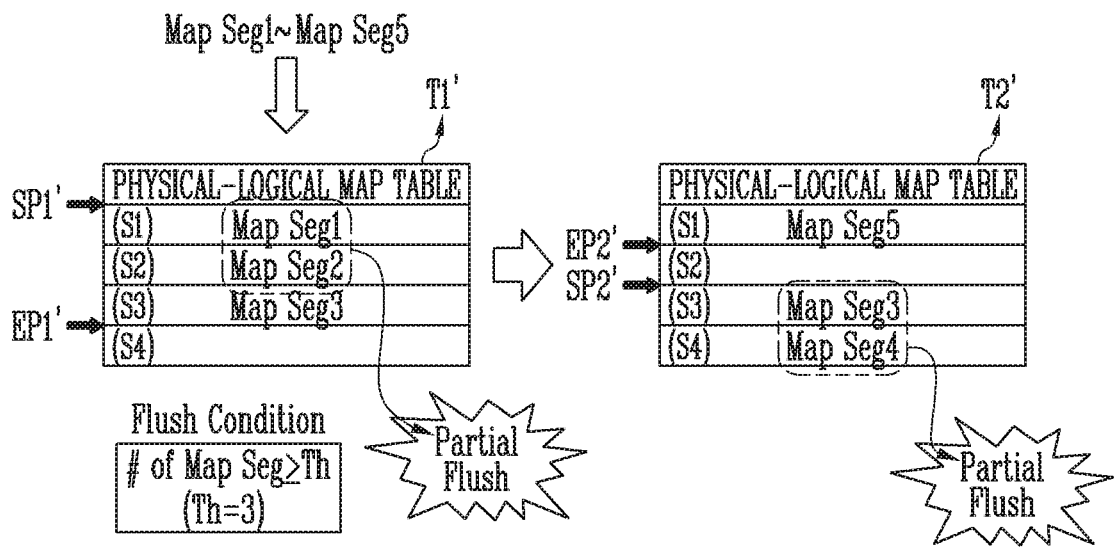
FIG. 11 is a diagram for describing a partial flush operation according to another embodiment.

FIG. 11 is a diagram for describing a partial flush operation according to another embodiment.

Referring to FIG. 11, in contrast to FIG. 9, a partial flush operation in which some P2L map segments of all P2L map segments stored in the P2L map table are flushed may be performed.

That is, even though the flush condition is satisfied, not all P2L map segments stored in the P2L map table are flushed, but only a predetermined number of some P2L map segments may be flushed. Therefore, the number of P2L map segments on which the partial flush operation is performed may be less than a threshold number of P2L map segments on which the flush occurs.

In FIG. 11, the threshold number of P2L map segments on which the flush occurs may be three. The number of P2L map segments on which the partial flush operation is performed may be two.

The first to fifth P2L map segments Map Seg1 to Map Seg5 may be sequentially stored in the P2L map table.

First, the first to third P2L map segments Map Seg1 to Map Seg3 may be sequentially stored in the first to third slots S1 to S3. A start point SP1' may be an index indicating the slot S1 in which the first P2L map segment Map Seg1 is stored. The first P2L map segment Map Seg1 may be a first one among the first to third P2L map segments Map Seg1 to Map Seg3. An end point EP1' may be an index indicating the slot S3 in which the third P2L map segment Map Seg3 is stored. The third P2L map segment Map Seg3 may be a last one among the first to third P2L map segments Map Seg1 to Map Seg3.

In this case, since the flush condition is satisfied, the partial flush for the first and second P2L map segments Map Seg1 and Map Seg2 which are some of all P2L map segments stored in the P2L map table may be performed.

After the partial flush operation is completed, the start point SP1 'may be updated to a start point SP2'. The start point SP2' may be an index of the slot S3 that stores the P2L map segment Map Seg3 next to the P2L map segment Map Seg2 that is last flushed.

After the partial flush operation is completed, the fourth and fifth P2L map segments Map Seg4 and Map Seg5 may be sequentially stored in the fourth and first slots S4 and S1. The end point EP1' may be updated to an end point EP2'. The end point EP2' may be an index of the slot S1 that stores the P2L map segment Map Seg5 that is last stored.

When the storage of the fourth and fifth P2L map segments Map Seg4 and Map Seg5 is completed, since the flush condition is satisfied, a partial flush for the third and fourth P2L map segments Map Seg3 and Map Seg4 may be performed in the same manner.

In FIG. 9, one full flush operation is performed, and the number of P2L map segments flushed at one time may be three. In contrast, in FIG. 11, two partial flush operations are performed, and the number of P2L map segments flushed at one time may be two.

That is, in the case of the partial flush operation, since an amount of map data flushed at one time is reduced in comparison with the full flush operation, a time required for a map update operation may be reduced. That is, the map update time may be distributed and managed by distributing the map update operation to a plurality of partial flush operations rather than of one full flush operation, according to the operation environment of the storage device.

Therefore, when the amount of map data flushed at one time is large, a map update timeout problem in which a map data process time exceeds a time limit may be prevented.

Figure 12:
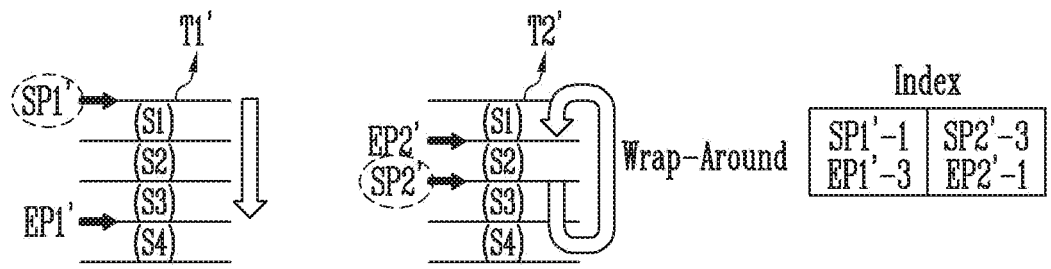
FIG. 12 is a diagram for describing a map data management structure of a P2L map table of FIG. 11.

FIG. 12 is a diagram for describing a map data management structure of the P2L map table of FIG. 11.

Referring to FIG. 12, when the partial flush operation is performed, the P2L map segments are sequentially flushed from the previous start point SP1', and the start point may be updated from the start point SP1' to a start point SP2'.

In addition, new P2L map segments may be sequentially stored from the previous end point EP1', and the end point may be updated from the end point EP1' to an end point EP2'.

Therefore, the start point to the end point may be circularly directed within the P2L map table stored in the P2L map table storage 222. In the P2L map table, the P2L map segments may be managed in a circular structure.

In this case, the start point may be updated every time the partial flush operation is performed, and the end point may be updated every time the new P2L map segment is stored.

In order to perform the partial flush operation rather than the full flush operation, differently from FIG. 10, the P2L map data may be managed in a circular structure in FIG. 12.

Figure 13:
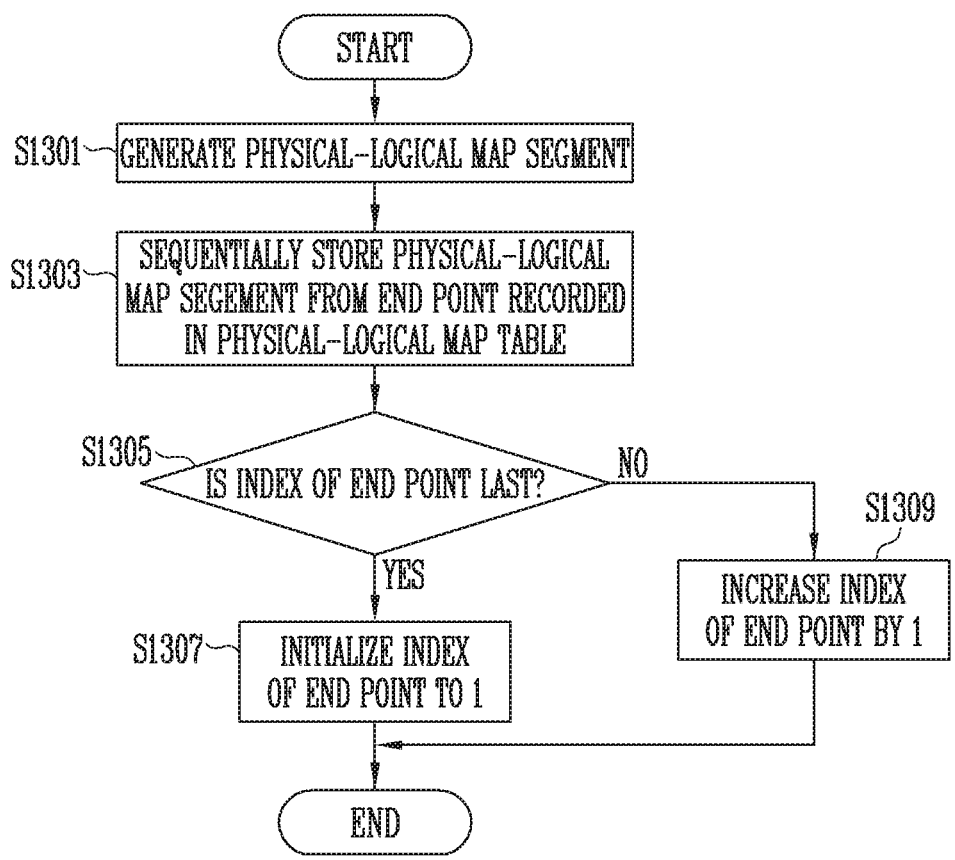
FIG. 13 is a flowchart for describing a storage operation (en-queueing) for a P2L map segment in FIG. 12.

FIG. 13 is a flowchart for describing a storage operation (en-queueing) for a P2L map segment in FIG. 12.

Referring to FIG. 13, in step S1301, the P2L map segment may be generated.

In step S1303, the P2L map segments may be sequentially stored from the end point recorded in the P2L map table, the end point being updated whenever the P2L map segment is stored.

In step S1305, it may be determined whether the index of the recorded end point is the last. Specifically, it may be determined whether the recorded end point is an index of the last slot included in the P2L map table storage. As a result of the determination, when the end point is the last slot, the process proceeds to step S1307, otherwise, the process proceeds to step S1309.

In step S1307, the end point may be initialized to 1. That is, the end point may be updated to the index of the first slot included in the P2L map table storage.

In step S1309, the end point may increase by one. That is, the end point may be updated to the index of the slot next to the slot in which the P2L map segment is last stored before step S1303.

Figure 14:
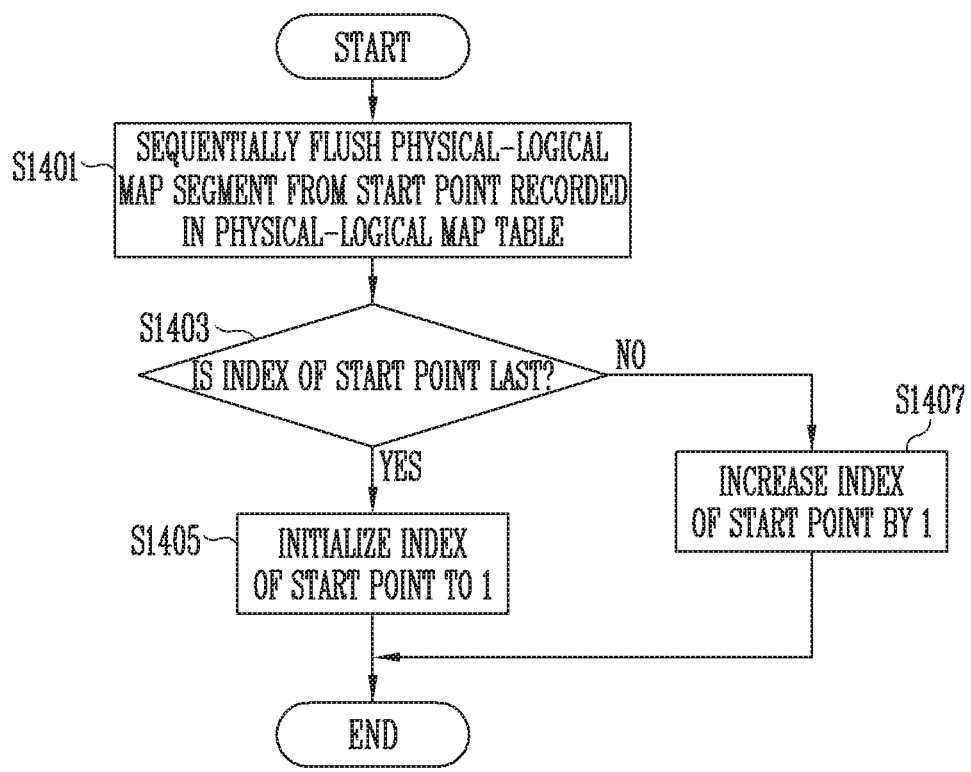
FIG. 14 is a flowchart for describing a flush operation (de-queueing) for the P2L map segment in FIG. 12.

FIG. 14 is a flowchart for describing a flush operation (de-queueing) for the P2L map segment in FIG. 12.

Referring to FIG. 14, in step S1401, the P2L map segments may be sequentially flushed from the start point recorded in the P2L map table, the start point being updated whenever the P2L map segment is flushed.

In step S1403, it may be determined whether the index of the recorded start point is the last slot. Specifically, it may be determined whether the recorded start point is an index of the last slot included in the P2L map table storage. As a result of the determination, when the start point is the last slot, the process proceeds to step S1405, otherwise, the process proceeds to step S1407.

In step S1405, the start point may be initialized to 1. That is, the start point may be updated to the index of the first slot included in the P2L map table storage.

In step S1407, the start point may increase by one. That is, the start point may be updated to the index of the slot next to the slot that stores the last flushed P2L map segment.

Figure 15:
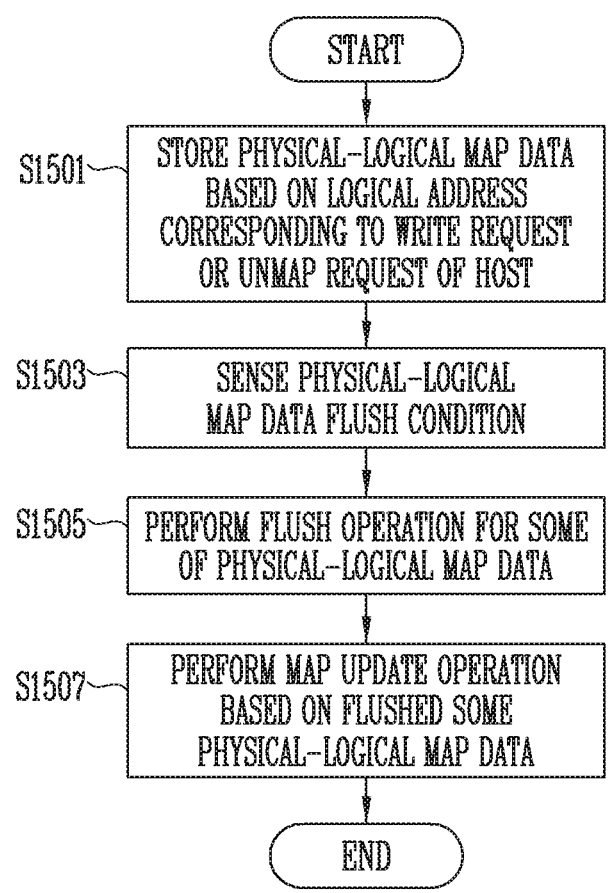
FIG. 15 is a flowchart for describing an operation of a memory controller according to an embodiment.

FIG. 15 is a flowchart for describing an operation of a memory controller according to an embodiment.

Referring to FIG. 15, in step S1501, the memory controller may store the P2L map data based on the logical address corresponding to the write request or the unmap request of the host. The logical address corresponding to the write request may be a logical address of data provided by the host. The logical address corresponding to the unmap request may be a logical address to be unmapped from an existing physical address.

In step S1503, the memory controller may sense a P2L map data flush condition. For example, the flush operation may be performed when the size of the stored P2L map data or the process expectation time is equal to or greater than the threshold value.

In step S1505, the memory controller may perform the flush operation for some of the stored P2L map data.

In step S1507, the memory controller may perform the map update operation of updating the L2P map data stored in the memory device based on some flushed P2L map data.

Figure 16:
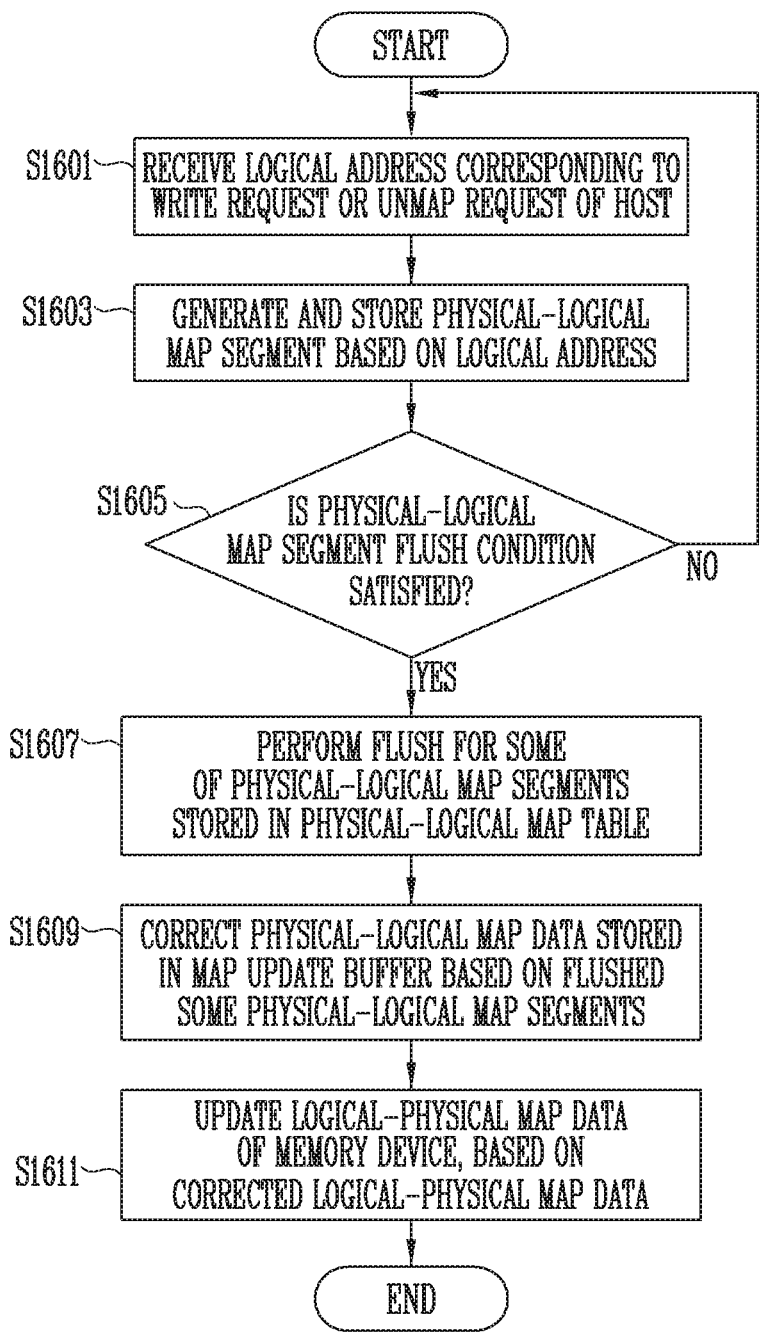
FIG. 16 is a flowchart for describing FIG. 15 in detail.

FIG. 16 is a flowchart for describing FIG. 15 in detail.

Referring to FIG. 16, in step S1601, the memory controller may receive the logical address corresponding to the write request or the unmap request of the host.

In step S1603, the memory controller may generate and store the P2L map data based on the received logical address. Specifically, when the received logical address is the write requested logical address, the memory controller may generate P2L map data indicating a mapping relationship between the physical address indicating a location where the write data is stored and the logical address. When the received logical address is the unmap-requested logical address, the memory controller may generate P2L map data obtained by changing an existing physical address mapped to the unmap-requested logical address to the unmap data.

In step S1605, the memory controller may determine whether a P2L map segment flush condition is satisfied. As a result of the determination, when the flush condition is satisfied, the process proceeds to step S1607, otherwise, the process proceeds to step S1601.

Specifically, when the number of stored P2L map segments is equal to or greater than the threshold number, or when the process expectation time for the stored P2L map segments is equal to or greater than the threshold time, the memory controller may determine that the flush condition is satisfied.

In step S1607, the memory controller may perform the flush operation for some of all of the P2L map segments included in the P2L map table.

In step S1609, the memory controller may update the L2P map data stored in the map update buffer based on the flushed some P2L map segments.

In step S1611, the memory controller may update the L2P map data stored in the memory device based on the updated L2P map data stored in the map update buffer.

Figure 17:
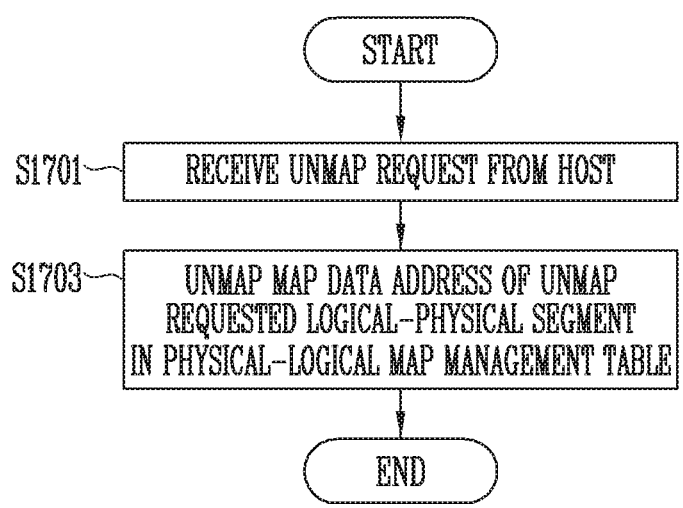
FIG. 17 is a flowchart for describing an operation of a memory controller according to another embodiment.

FIG. 17 is a flowchart for describing an operation of a memory controller according to another embodiment.

Referring to FIG. 17, in step S1701, the memory controller may receive the unmap request from the host. The memory controller may receive the unmap-requested logical address together with the unmap request.

In step S1703, the memory controller may unmap the map data address of the unmap-requested L2P segment in the L2P map management table. The L2P map management table may include map data addresses indicating locations where a plurality of L2P map segments are stored in the memory device. Specifically, the memory controller may change the map data address of the unmap-requested L2P segment to the unmap data. In this case, the data stored in the physical addresses included in the unmapped L2P segment may be recognized as erased data in the host and the storage device.

Figure 18:
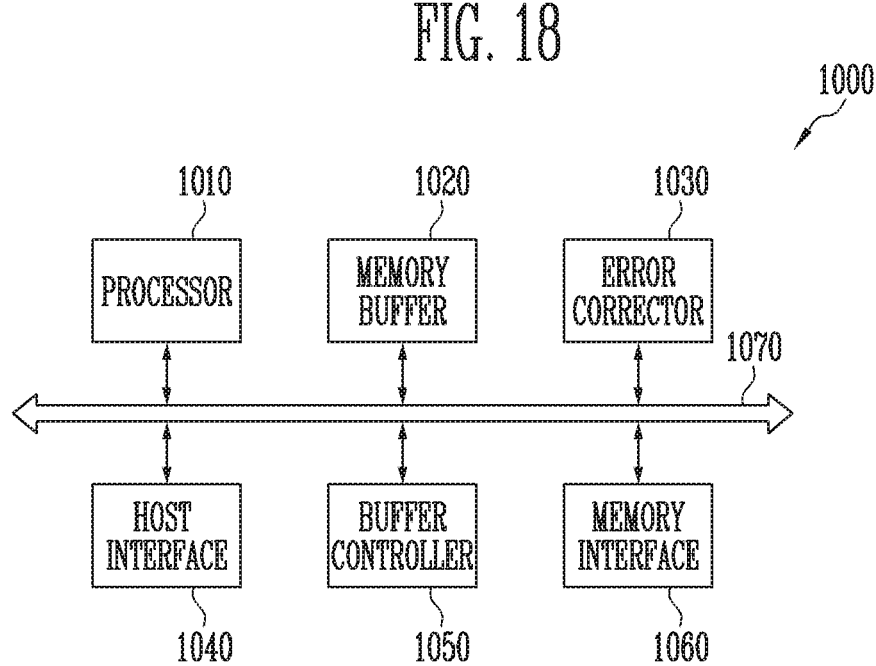
FIG. 18 is a diagram for describing another embodiment of the memory controller of FIG. 1.

FIG. 18 is a diagram for describing another embodiment of the memory controller of FIG. 1.

Referring to FIG. 18, the memory controller 1000 is connected to the host Host and the memory device. The memory controller 1000 is configured to access the memory device in response to the request from the host Host. For example, the memory controller 1000 is configured to control write, read, erase, and background operations of the memory device. The memory controller 1000 is configured to provide an interface between the memory device and the host Host. The memory controller 1000 is configured to drive firmware for controlling the memory device.

The memory controller 1000 may include a processor 1010, a memory buffer 1020, an error corrector (ECC) 1030, a host interface 1040, a buffer control circuit 1050, a memory interface 1060, and a bus 1070.

The bus 1070 may be configured to provide a channel between components of the memory controller 1000.

The processor 1010 may control overall operations of the memory controller 1000 and may perform a logical operation. The processor 1010 may communicate with an external host through the host interface 1040 and communicate with the memory device through the memory interface 1060. In addition, the processor 1010 may communicate with the memory buffer 1020 through the buffer controller 1050. The processor 1010 may control an operation of the storage device using the memory buffer 1020 as an operation memory, a cache memory, or a buffer memory.

The processor 1010 may perform a function of a flash translation layer (FTL). The processor 1010 may convert a logical block address (LBA) provided by the host into a physical block address (PBA) through the flash translation layer (FTL). The flash translation layer (FTL) may receive the logical block address (LBA) using a mapping table and may convert the logical block address (LBA) into the physical block address (PBA). There are various address mapping methods of the flash translation layer, according to a mapping unit. Representative address mapping methods include a page mapping method, a block mapping method, and a hybrid mapping method.

The processor 1010 is configured to randomize data received from the host Host. For example, the processor 1010 may randomize the data received from the host Host using a randomizing seed. The randomized data is provided to the memory device as data to be stored and is programmed to the memory cell array.

The processor 1010 is configured to de-randomize data received from the memory device during the read operation. For example, the processor 1010 may de-randomize the data received from the memory device using a de-randomizing seed. The de-randomized data may be output to the host Host.

As an embodiment, the processor 1010 may perform the randomization and the de-randomization by driving software or firmware.

The memory buffer 1020 may be used as an operation memory, a cache memory, or a buffer memory of the processor 1010. The memory buffer 1020 may store codes and commands executed by the processor 1010. The memory buffer 1020 may store data processed by the processor 1010. The memory buffer 1020 may include a static RAM (SRAM) or a dynamic RAM (DRAM).

The error corrector 1030 may perform error correction. The error corrector 1030 may perform error correction encoding (ECC encoding) based on data to be written to the memory device through memory interface 1060. The error correction encoded data may be transferred to the memory device through the memory interface 1060. The error corrector 1030 may perform error correction decoding (ECC decoding) on the data received from the memory device through the memory interface 1060. As an example, the error corrector 1030 may be included in the memory interface 1060 as a component of the memory interface 1060.

The host interface 1040 is configured to communicate with an external host under control of the processor 1010. The host interface 1040 may be configured to perform communication using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI express), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The buffer controller 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

As an example, the memory controller 1000 may not include the memory buffer 1020 and the buffer controller 1050.

As an example, the processor 1010 may control the operation of the memory controller 1000 using codes. The processor 1010 may load the codes from a non-volatile memory device (for example, a read only memory) provided inside the memory controller 1000. As another example, the processor 1010 may load the codes from the memory device through the memory interface 1060.

As an example, the bus 1070 of the memory controller 1000 may be divided into a control bus and a data bus. The data bus may be configured to transmit data within the memory controller 1000 and the control bus may be configured to transmit control information such as a command and an address within the memory controller 1000. The data bus and the control bus may be separated from each other and may not interfere with each other or affect each other. The data bus may be connected to the host interface 1040, the buffer controller 1050, the error corrector 1030, and the memory interface 1060. The control bus may be connected to the host interface 1040, the processor 1010, the buffer controller 1050, the memory buffer 1202, and the memory interface 1060.

Figure 19:
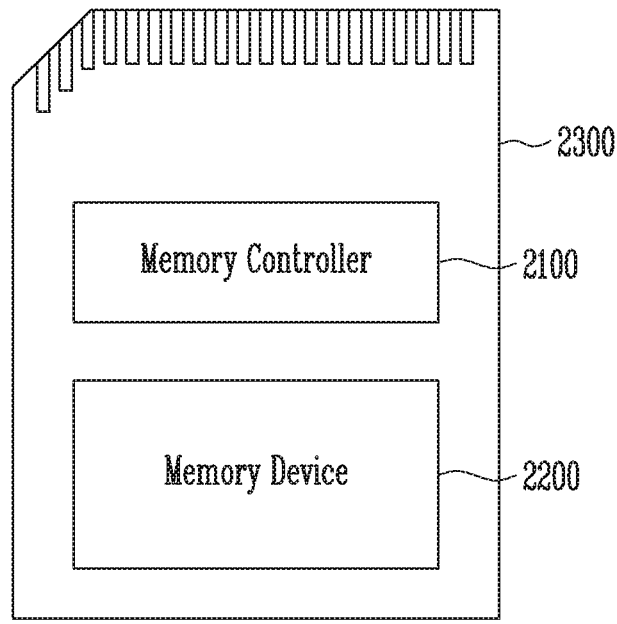
FIG. 19 is a block diagram illustrating a memory card system to which a storage device according to an embodiment of the present disclosure is applied.

FIG. 19 is a block diagram illustrating a memory card system to which a storage device according to an embodiment of the present disclosure is applied.

Referring to FIG. 19, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 may be configured to control read, write, erase, and background operations of the memory device 2200. The memory controller 2100 is configured to provide an interface between the memory device 2200 and the host Host. The memory controller 2100 is configured to drive firmware for controlling the memory device 2200. The memory controller 2100 may be implemented in the same manner as the memory controller 200 described with reference to FIG. 1.

As an example, the memory controller 2100 may include components such as a random access memory (RAM), a processor, a host interface, a memory interface, and an error corrector.

The memory controller 2100 may communicate with an external device through the connector 2300. The memory controller 2100 may communicate with an external device (for example, the host) according to a specific communication standard. As an example, the memory controller 2100 is configured to communicate with an external device through at least one of various communication standards such as a universal serial bus (USB), a multimedia card (MMC), an embedded MMC (MCM), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), Fire-Wire, a universal flash storage (UFS), Wi-Fi, Bluetooth, and an NVMe. As an example, the connector 2300 may be defined by at least one of the various communication standards described above.

As an example, the memory device 2200 may be configured as various non-volatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-torque magnetic RAM (STT-MRAM).

The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 20:
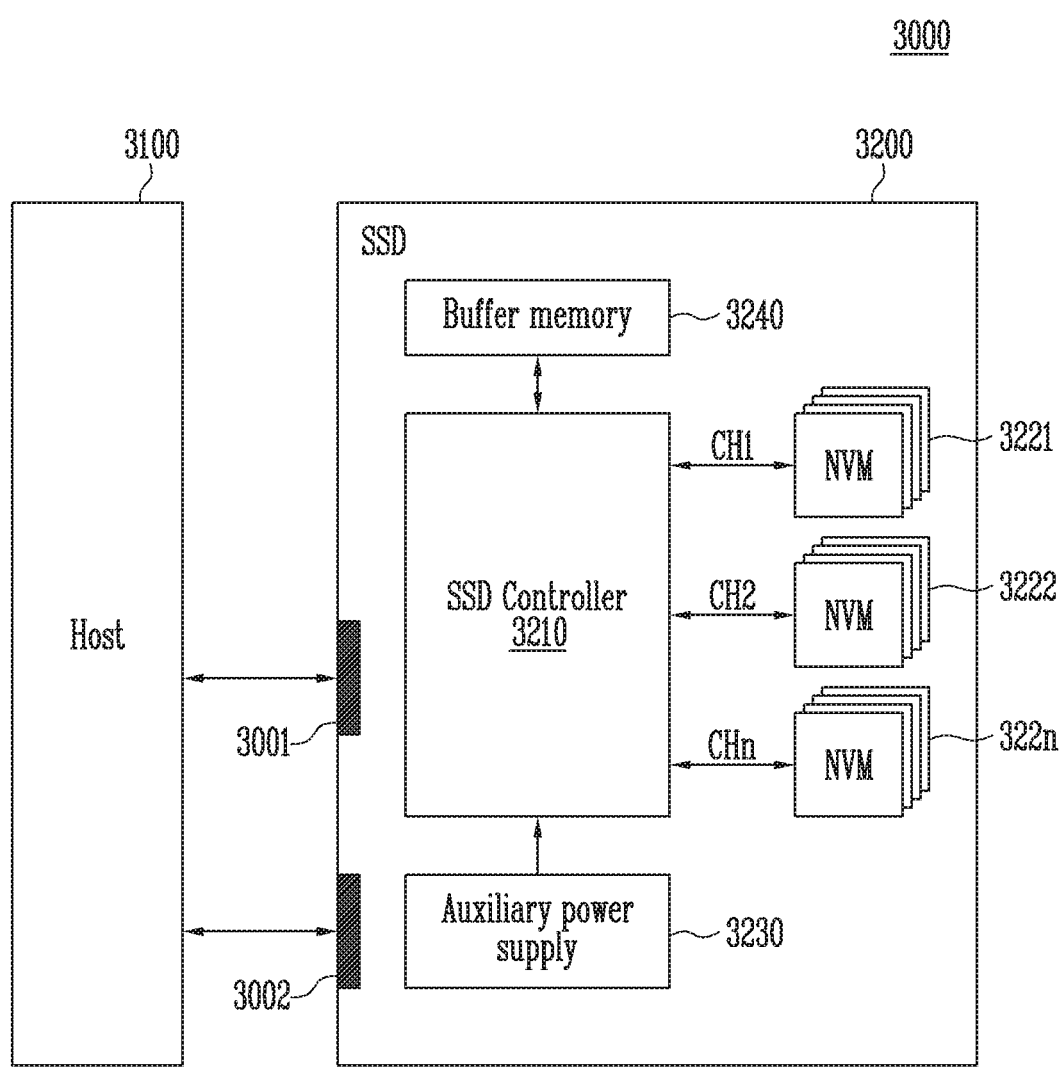
FIG. 20 is a block diagram illustrating a solid state drive (SSD) system to which a storage device according to an embodiment of the present disclosure is applied.

FIG. 20 is a block diagram illustrating a solid state drive (SSD) system to which a storage device according to an embodiment of the present disclosure is applied.

Referring to FIG. 20, the SSD system 3000 includes a host 3100 and an SSD 3200. The SSD 3200 exchanges a signal SIG with the host 3100 through a signal connector 3001 and receives power PWR through a power connector 3002. The SSD 3200 includes an SSD controller 3210, a plurality of flash memories 3221 to 322n, an auxiliary power device 3230, and a buffer memory 3240.

According to an embodiment of the present disclosure, the SSD controller 3210 may perform the function of the memory controller 200 described with reference to FIG. 1.

The SSD controller 3210 may control the plurality of flash memories 3221 to 322n in response to the signal SIG received from the host 3100. As an example, the signal SIG may be signals based on an interface between the host 3100 and the SSD 3200. For example, the signal SIG may be a signal defined by at least one of interfaces such as a universal serial bus (USB), a multimedia card (MMC), an embedded MMC (MCM), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), Fire-Wire, a universal flash storage (UFS), Wi-Fi, Bluetooth, and an NVMe.

The auxiliary power device 3230 is connected to the host 3100 through the power connector 3002. The auxiliary power device 3230 may receive the power PWR from the host 3100 and may charge the power. The auxiliary power device 3230 may provide power of the SSD 3200 when power supply from the host 3100 is not smooth. As an example, the auxiliary power device 3230 may be positioned in the SSD 3200 or may be positioned outside the SSD 3200. For example, the auxiliary power device 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store metadata (for example, a mapping table) of the flash memories 3221 to 322n. The buffer memory 3240 may include a volatile memory such as a DRAM, an SDRAM, a DDR SDRAM, an LPDDR SDRAM, and a GRAM, or a non-volatile memory such as an FRAM, a ReRAM, an STT-MRAM, and a PRAM.

Figure 21:
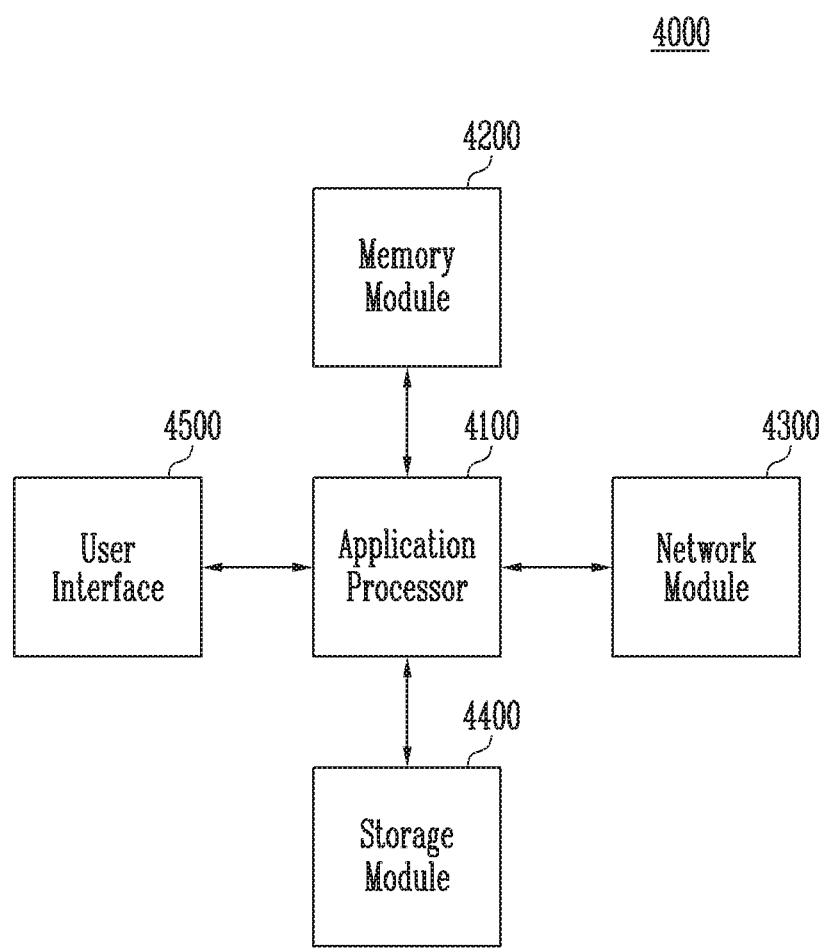
FIG. 21 is a block diagram illustrating a user system to which a storage device according to an embodiment of the present disclosure is applied.

FIG. 21 is a block diagram illustrating a user system to which a storage device according to an embodiment of the present disclosure is applied.

Referring to FIG. 21, the user system 4000 includes an application processor 4100, a memory module 4200, a network module 4300, a storage module 4400, and a user interface 4500.

The application processor 4100 may drive components, an operating system (OS), a user program, or the like included in the user system 4000. As an example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a non-volatile random access memory, such as a PRAM, a ReRAM, an MRAM, and an FRAM. As an example, the application processor 4100 and memory module 4200 may be packaged based on a package on package (POP) and provided as one semiconductor package.

The network module 4300 may communicate with external devices. As an example, the network module 4300 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, and Wi-Fi. As an example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. As an example, the storage module 4400 may be implemented as a non-volatile semiconductor memory element such as a phase-change RAM (PRAM), a magnetic RAM (MRAM), a resistive RAM (RRAM), a NAND flash, a NOR flash, and a three-dimensional NAND flash. As an example, the storage module 4400 may be provided as a removable storage device (removable drive), such as a memory card, and an external drive of the user system 4000.

As an example, the storage module 4400 may include a plurality of non-volatile memory devices, and the plurality of non-volatile memory devices may operate equally to the memory device 100 described with reference to FIG. 1. The storage module 4400 may operate equally to the storage device 50 described with reference to FIG. 1.

The user interface 4500 may include interfaces for inputting data or an instruction to the application processor 4100 or for outputting data to an external device. As an example, the user interface 4500 may include user input interfaces such as a keyboard, a keypad, a button, a touch panel, a touch screen, a touch pad, a touch ball, a camera, a microphone, a gyroscope sensor, a vibration sensor, and a piezo-electric element. The user interface 4500 may include user output interfaces such as a liquid crystal display (LCD), an organic light emitting diode (OLED) display device, an active matrix OLED (AMOLED) display device, an LED, a speaker, and a monitor.

What is claimed is:

1. A memory controller, which controls a memory device that stores logical to physical (L2P) map data, the memory controller comprising:
a map data storage configured to store physical to logical (P2L) map data generated based on a logical address corresponding to a request received from a host; and
a map data manager configured to perform a map update operation for the L2P map data by using a portion of an entire P2L map data stored in the map data storage based on a comparison between a threshold value and an amount of the entire P2L map data stored in the map data storage,
wherein an amount of the portion of the entire P2L map data is less than the threshold value.

2. The memory controller of claim 1,
wherein the map data storage includes a P2L map table storage configured to store the P2L map data by a unit of a P2L map data segment of a preset size, and
wherein the P2L map data segment includes the P2L map data by a unit of a map data chunk.

3. The memory controller of claim 2, wherein, when the request is a write request, the P2L map table storage stores the P2L map data indicating a mapping relationship between a physical address indicating a location where data according to the write request is to be stored and a logical address corresponding to the write request.

4. The memory controller of claim 2, wherein, when the request is an unmap request, the P2L map table storage stores the P2L map data indicating a mapping relationship between unmap data and a logical address corresponding to the unmap request.

5. The memory controller of claim 2, wherein the P2L map table storage stores the P2L map data represented by a start address and length information of continuous physical addresses mapped to at least one logical address corresponding to the request.

6. The memory controller of claim 2,
wherein the P2L map table storage includes a plurality of storage areas respectively corresponding to a plurality of indices and storing a P2L map segment,
wherein the P2L map table storage sequentially stores the P2L map data as at least one or more P2L map segments in selected storage areas among the plurality of storage areas,
wherein the P2L map table storage records, as a start point, an index of the storage area in which a first one of the P2L map segments is stored among the selected storage areas, and
wherein the P2L map table storage records, as an end point, an index of the storage area in which a last one of the P2L map segments is stored among the selected storage areas.

7. The memory controller of claim 6,
wherein the P2L map table storage stores a new P2L map segment in a storage area corresponding to an index next to the end point among the plurality of storage areas, and
wherein the P2L map table storage updates the end point to the index of the storage area in which the new P2L map segment is stored.

8. The memory controller of claim 6,
wherein the P2L map table storage flushes the P2L map segment stored in the storage area corresponding to the start point among the plurality of storage areas, and
wherein the P2L map table storage updates the start point to an index next to an index of the storage area from which the P2L map segment is flushed.

9. The memory controller of claim 2,
wherein the L2P map data stored in the memory device includes a plurality of L2P map segments, and
wherein the map data storage further includes a L2P map management table storage configured to store map data addresses indicating locations where the plurality of L2P map segments are stored in the memory device.

10. The memory controller of claim 9, wherein, when the request is an unmap request, the map data manager changes, to unmap data, a selected map data address among the map data addresses in the L2P map management table storage, and
wherein the selected map data address indicates a location where a L2P map segment corresponding to the unmap request among the plurality of L2P map segments is stored.

11. The memory controller of claim 2, further comprising a map update buffer configured to receive, from the memory device, L2P map data to be updated among the L2P map data stored in the memory device and to store the L2P map data.

12. The memory controller of claim 11, wherein the map data manager is further configured to:
select one or more P2L map segments to be flushed among the stored P2L map segments, based on a number of P2L map segments stored in the P2L map table storage or a process expectation time for the stored P2L map segments, and
generate map flush control information for flushing the selected one or more P2L map segments.

13. The memory controller of claim 12, wherein the threshold value includes one of a threshold number and a threshold time, and
wherein the map data manager generates the map flush control information when the number of stored P2L map segments is equal to or greater than the threshold number or when the process expectation time for the stored P2L map segments is equal to or greater than the threshold time.

14. The memory controller of claim 12, wherein the P2L map table storage is further configured to:
provide the selected one or more P2L map segments to the map update buffer in response to the map flush control information, and
delete the selected one or more P2L map segments.

15. The memory controller of claim 12, wherein the map data manager is further configured to generate map update control information for updating the L2P map data stored in the map update buffer based on the selected one or more P2L map segments.

16. The memory controller of claim 15, wherein the map update buffer is further configured to update the L2P map data stored therein based on the selected one or more P2L map segments, and to provide the updated L2P map data to the memory device, in response to the map update control information.

17. A method of operating a memory controller, which controls a memory device that stores logical to physical (L2P) map data indicating a mapping relationship between a logical address and a physical address of data stored in the memory device, and includes a map data storage, the method comprising:

storing physical to logical (P2L) map data generated based on a logical address corresponding to a request received from a host in the map data storage; and performing a map update operation for the L2P map data by using a portion of an entire P2L map data stored in the map data storage based on a comparison between a threshold value and an amount of the entire P2L map data stored in the map data storage, wherein an amount of the portion of the entire P2L map data is less than the threshold value.

18. The method of claim 17, wherein performing the map update operation comprises:

providing the portion of the entire P2L map data to the memory device, based on the comparison between the threshold value and the amount of the entire P2L map data stored in the map data storage or a process expectation time for the amount of the entire P2L map data; and controlling the memory device to update the L2P map data stored in the memory device based on the selected P2L map data.

19. The method of claim 17, wherein the P2L map data is stored by using a start address and length information of continuous physical addresses mapped to a logical address corresponding to the request.

20. The method of claim 17, wherein the map data storage includes a plurality of storage areas respectively corresponding to a plurality of indices and storing P2L map segment, and wherein the storing comprises:

storing the P2L map data as at least one or more P2L map segments in selected storage areas among the plurality of storage areas based on a unit of a P2L map data segment of a preset size;

recording, as a start point, an index of a storage area in which a first one of the at least one or more P2L map segments is stored among the selected storage areas; and recoding, as an end point, an index of a storage area in which a last one of the at least one or more P2L map segments is stored among the selected storage areas;

storing a new P2L map segment in a storage area corresponding to an index next to the end point and updating the end point to the index of the storage area in which the new P2L map segment is stored; and flushing a P2L map segment stored in a storage area corresponding to the start point and updating the start point to an index next to an index of the storage area from which the P2L map segment is flushed.

\* \* \* \* \*

UNITED STATES PATENT AND TRADEMARK OFFICE
CERTIFICATE OF CORRECTION

| | |
|---|---|
| PATENT NO. | : 11,301,150 B2 |
| APPLICATION NO. | : 16/698296 |
| DATED | : April 12, 2022 |
| INVENTOR(S) | : Hye Mi Kang |

It is certified that error appears in the above-identified patent and that said Letters Patent is hereby corrected as shown below:

On the Title Page

Please add the reference to show as follows:
(56)     References Cited
FOREIGN PATENT DOCUMENTS
KR     10-2018-0003715          01/2018

Signed and Sealed this
Seventeenth Day of May, 2022

Katherine Kelly Vidal
*Director of the United States Patent and Trademark Office*